United States Patent [19]

Uchida et al.

[11] Patent Number: 4,860,635
[45] Date of Patent: * Aug. 29, 1989

[54] STEERING CONTROL VALVE FOR VARIABLE POWER ASSIST STEERING SYSTEM

[75] Inventors: Koh Uchida, Tokyo; Takashi Kurihara, Atsugi, all of Japan

[73] Assignee: Nissan Motor Co., Ltd., Yokohama, Japan

[*] Notice: The portion of the term of this patent subsequent to Aug. 1, 2006 has been disclaimed.

[21] Appl. No.: 44,065

[22] Filed: Apr. 29, 1987

[30] Foreign Application Priority Data

May 12, 1986 [JP] Japan ................................ 61-109293
Sep. 29, 1986 [JP] Japan ................................ 61-228456

[51] Int. Cl.$^4$ .............................................. F15B 9/10
[52] U.S. Cl. ..................................... 91/375 A; 91/443; 137/625.24; 137/596.12; 180/142; 180/143
[58] Field of Search ................ 91/375 R, 375 A, 437, 91/443; 137/625.24, 596.12; 180/142, 143

[56] References Cited

U.S. PATENT DOCUMENTS

| 4,465,098 | 8/1984 | Bacardit | 625/21 |
| 4,512,238 | 4/1985 | Bacardit | 370/ |
| 4,561,521 | 12/1985 | Duffy | 180/142 |
| 4,570,735 | 2/1986 | Duffy | 180/142 |
| 4,594,936 | 6/1986 | Bacardit | 91/51 |

FOREIGN PATENT DOCUMENTS

| 0072731 | 2/1983 | European Pat. Off. . |
| 0084487 | 7/1983 | European Pat. Off. . |
| 2568843 | 2/1986 | France . |
| 54-15232 | 2/1979 | Japan . |
| 58-156459 | 9/1983 | Japan . |
| 61-43229 | 9/1986 | Japan . |

Primary Examiner—Robert E. Garrett
Assistant Examiner—Mark A. Williamson
Attorney, Agent, or Firm—Foley & Lardner, Schwartz, Jeffery, Schwaab, Mack, Blumenthal & Evans

[57] ABSTRACT

A steering control valve for a power steering system for a vehicle includes a valve structure which defines a plurality of variable flow orifices as steering input torque is applied thereby creating pressure differential acting on fluid motor. A solenoid operated variable flow orifice valve is operable in response to a control factor, such as vehicle speed, other than the steering input torque defines a variable flow orifice connected in series with one of the plurality of variable flow orifices.

18 Claims, 23 Drawing Sheets

STEERING CONTROL VALVE FOR VARIABLE POWER ASSIST STEERING SYSTEM

BACKGROUND OF THE INVENTION

The present invention relates to a power steering system for a vehicle, and more particularly to a steering control valve for a power steering system.

Among known power steering mechanisms, U.S. Pat. No. 4,561,521 discloses a power steering mechanism for an automotive vehicle having a pressure operated vehicle steering mechanism controlled by a rotary valve with primary and secondary valve portions. The primary valve portion develops a fast-rising steering pressure characteristic for incremental changes in steering torque at low driving speed and a flatter or more gradual steering pressure rise characteristic for incremental changes in steering torque at high driving speeds. The latter resulting from the action of the secondary valve portion which functions in cooperation with the primary valve portion whereby the pressure versus torque relationship is optimized for parking maneuvers, for driving maneuvers and for center-feel. The change from the low speed steering mode to the high speed steering mode is accomplished gradually whereby the center-feel increases in proportion to increasing road speed. A speed sensitive valve is used to control fluid flow from the outlet side of a pump to the secondary valve portion so that at high vehicle speeds a parallel flow path is provided between the steering control valve and the pump as fluid is distributed to both primary and secondary valve portions. At low vehicle speeds, a speed sensitive valve restricts the flow of fluid from the pump to the secondary valve portion. Above a predetermined speed the speed sensitive valve opens thereby allowing fluid to be distributed from the pump to the secondary valve portion in parallel with respect to the flow to the primary valve portion. A change from a high degree of power assist to a low degree of power assist and vice versa is effected by a variable force solenoid which is used to establish a parallel flow path from the pump to the secondary valve portion through a variable flow orifice. A speed sensing module controls the solenoid to open and close a variable orifice valve thus providing gradual changes in the degree of power assist as the vehicle speed changes.

U.S. Pat. No. 4,570,735 discloses a power steering gear mechanism having a pressure operated vehicle steering mechanism controlled by a rotary valve with primary and secondary valve portions. This rotary valve is similar to the above mentioned known rotary valve.

The known steering control valves disclosed by the above two U.S. Patents use a rotary valve with primary and secondary valve portions which are arranged out of position in the axial direction along the axis of rotation of the rotary valve. The valve grooves for the rotary valve are difficult to manufacture and require skilled labor. The arrangement of the primary and secondary valve portions causes increased axial length of the rotary valve.

SUMMARY OF THE INVENTION

A power steering system uses a power steering pump to supply working fluid to the fluid motor thus actuating the piston that drives a steering mechanism of the vehicle. The power steering pump is engine driven. It is provided in known fashion with a constant flow of fluid to a steering control valve regardless of the pump speed.

The steering control valve for controlling distribution of pressure to the power cylinder for the steering system includes an inner valve member and a surrounding sleeve. The inner valve member is displaceable relative to the surrounding sleeve upon application of a steering torque.

The valve structure has valve lands formed on the inner valve member and internal lands of the surrounding sleeve. The internal lands register with the valve lands. The valve lands cooperate with the internal lands to define a plurality of variable flow orifices fluidly disposed between the fluid flow inlet port and the fluid flow return port. The plurality of variable flow orifices vary their flow areas as the inner member moves relative to the surrounding sleeve in response to the input torque applied thereto to cause hydraulic fluid pressures to develop at the left turn and right turn outlet ports to effect pressure differential forces acting on the fluid motor.

The plurality of variable flow orifices consist of and are divided into a first group of variable flow orifices and a second group of variable flow orifices. The first group of variable flow orifices decrease their flow areas arranged so as to be effective in development of the hydraulic fluid pressure at the right turn outlet port as the inner member moves in one direction relative to the surrounding sleeve. The second group of variable flow orifices decrease their flow areas arranged so as to be effective in development of hydraulic fluid pressure at the left turn outlet port as the inner member moves in the opposite direction relative to the surrounding sleeve. There is provided a variable flow orifice valve means fluidly disposed between the fluid flow inlet port and the fluid flow return port. The variable flow orifice valve means defines a variable flow orifice connected in series with a predetermined one of each of the first and second group of variable flow orifices, and it is responsive to a predetermined one of vehicle control factors other than the steering input torque applied to the inner valve member for varying the flow area of the variable flow orifice thereof.

DETAILED DESCRIPTION OF THE INVENTION

Figure 1:
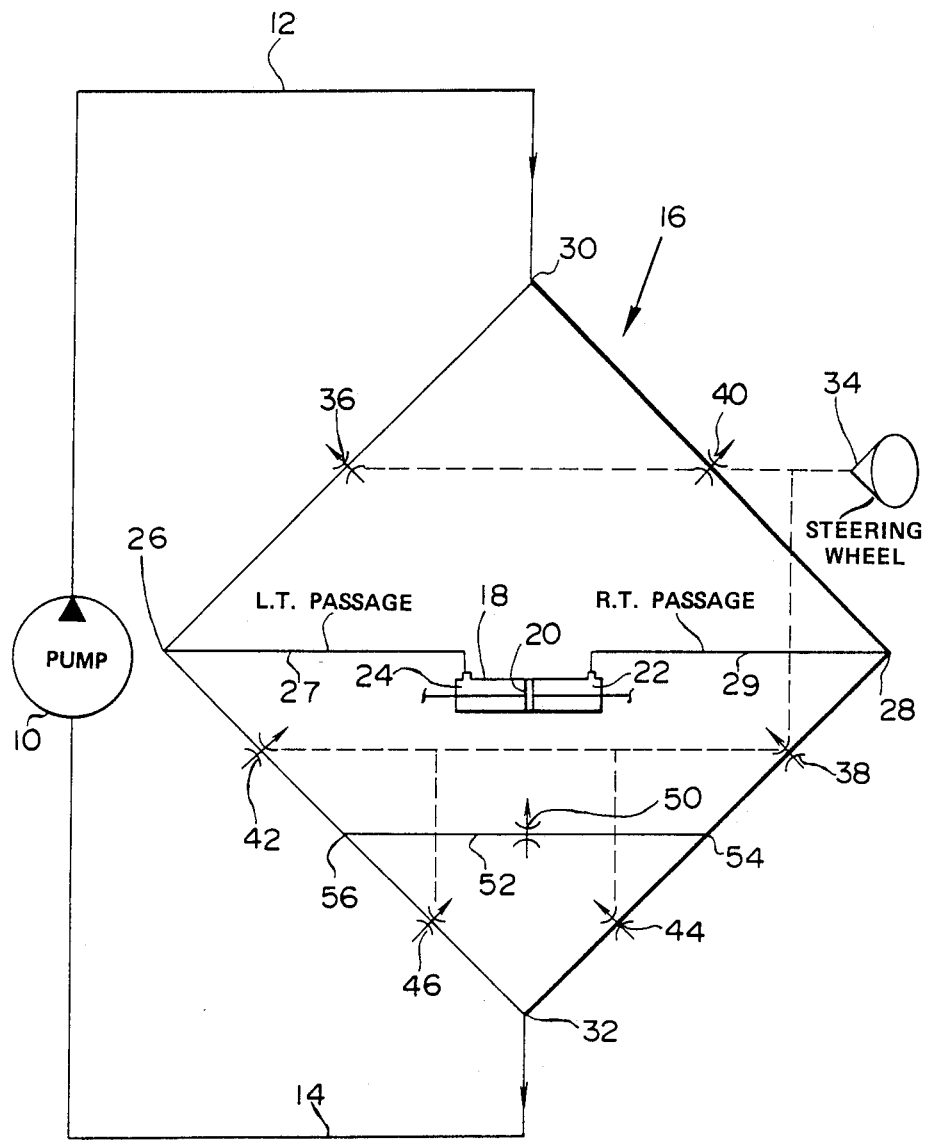
FIG. 1 is a simplified illustration of a hydraulic circuit including variable flow orifices defined by the valve structure of an embodiment of a steering control valve according to the present invention.

In FIG. 1, numeral 10 designates a power steering pump for a vehicle power steering system having a vehicle engine and dirigible vehicle wheels. The pump 10 is adapted to be driven by the vehicle engine. It includes a flow control valve of well-known design for maintaining a constant flow in an output flow passage 12 regardless of vehicle speed. The flow return passage for the pump 10 is shown at 14.

Figure 2:
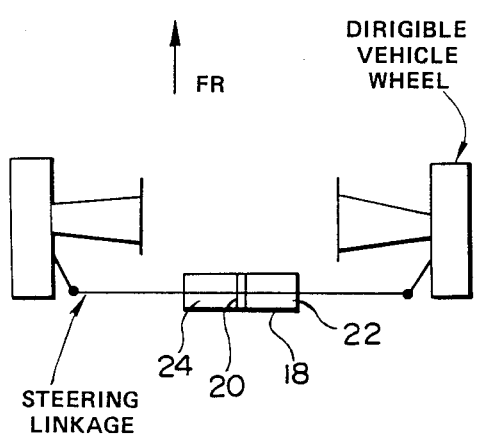
FIG. 2 is a simplified illustration of a vehicle steering linkage.

A steering control valve is shown generally at 16 as being situated in and defining pressure distribution and flow return passages extending to a fluid motor in the form of a power cylinder 18 having a power piston 20 which is connected to a steering linkage of the vehicle as shown in FIG. 2. The power piston 20 defines within the power cylinder 18 two chambers 22 and 24.

The control valve 16 has a left turn outlet port, illustrated by a junction 26, communicating with a left turn passage 27 which in turn communicates with the chamber 24 of the power cylinder 18, and a right turn outlet port, illustrated by a junction 28, communicating with a right turn passage 29 which in turn communicates with the other chamber 22. An inlet port and a return port are also illustrated by junctions 30 and 32. Also illustrated is a steering wheel 34.

The control valve 16 includes a first set of variable flow orifices 36, 40, 44, and 46, and a second set of variable flow orifices 38 and 42.

The variable flow orifices 36 and 44 of the first set decrease their flow areas respectively as steering torque increases during right turn of the steering wheel 34. The variable orifice 36 of the first set is fluidly disposed between the inlet port 30 communicating with the pump output flow passage 12 and the left turn outlet port 26. The variable flow orifice 44 of the first set is fluidly disposed between the right turn outlet port 28 and the return port 32 communicating with the flow return passage 14. The variable flow orifices 40 and 46 of the first set decrease their flow areas respectively as steering torque increases during left turn of the steering wheel 34. The variable flow orifice 40 of the first set is fluidly disposed between the inlet port 30 communicating with the pump output flow passage 12 and the right turn outlet port 28. The variable flow orifice 46 of the first set is fluidly disposed between the left turn outlet port 26 and the return port 32 communicating with the flow return passage 14. The variable flow orifice 38 of the second set is fluidly disposed between the right turn outlet port 28 and the return port 32 and connected in series with the variable flow orifice 44 of the first set. More particularly, the variable flow orifice 38 is fluidly disposed between the variable flow orifice 44 and the right turn outlet port 28 and it cooperates with the variable flow orifice 44 to decrease its flow area as steering torque increases during right turn of the steering wheel 34. The variable flow orifice 42 of the second set is fluidly disposed between the left turn outlet port 26 and the return port 32 and connected in series with the variable flow orifice 46. More particularly, the variable flow orifice 42 is fluidly disposed between the variable flow orifice 46 and the left turn outlet port 26 and cooperates with the variable flow orifice 46 to decrease its flow area as the steering torque increase during the left turn of the steering wheel 34.

A vehicle speed sensitive variable flow orifice 50 is fluidly disposed in and defines a bypass passage 52 having one end communicating with a bypass port, illustrated by a junction 54, and an opposite end communicating with another bypass port, illustrated by a junction 56. The bypass port 54 opens at a location fluidly disposed between the variable flow orifices 38 and 44, while another bypass port 56 opens at a location fluidly disposed between the variable flow orifices 42 and 46. The vehicle speed sensitive variable flow orifice 50 is operable responsive to sensed vehicle speed and progressively increases flow area as the vehicle speed increases.

Figure 3:
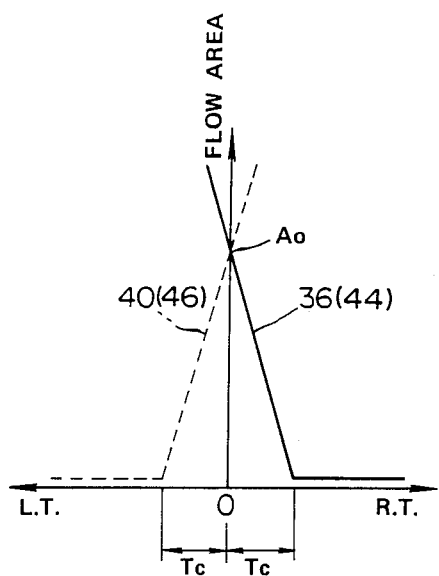
FIG. 3 is a chart that shows the relationship between the flow area and the steering torque.

The relationship between flow area of the variable flow orifice 36 (44) and steering torque is indicated by a fully drawn line in FIG. 3, whereas that between flow area of the variable flow orifice 40 (46) and steering torque is indicated by a broken line therein. The flow area of the variable flow orifice 36 (44) is Ao at zero steering torque, decreases linearly as steering torque increase during right turn of steering wheel 34 until it becomes substantially zero when the magnitude of steering torque reaches a predetermined value Tc. Similarly, the flow area of the variable flow orifice 40 (46) decreases from Ao to zero as steering torque increases during left turn of the steering wheel 34. The relationship between flow area of the variable flow orifice 38 and steering torque is indicated by a fully drawn line in FIG. 4, whereas that between flow area of the variable flow orifice 42 and steering torque is indicated by a broken line therein. The flow area of the variable flow orifice 38 is $A_1$ at zero steering torque, decreases linearly as steering torque increases during right turn of steering wheel 34 until it becomes substantially zero when the magnitude of steering torque reaches a predetermined value Tc'. Similarly, the flow area of the variable flow orifice 42 decreases from $A_1$ to zero as steering torque increases during left turn of the steering wheel 34. The vehicle speed sensitive variable flow orifice valve 50 is fully closed at zero vehicle speed and gradually increases its flow area as the vehicle speed increases as indicated in FIG. 5.

When the steering wheel 34 is not manipulated so that no steering torque is applied to the control valve 16, the fluid discharged by the pump 10 is distributed equally into two flows, one passing though the variable flow orifices 36, 42, and 46 to the flow return passage 14, the other passing through the variable flow orifices 40, 38, and 44 to the return passage 14. In this case, substantially no pressure differential acts on the piston 20 so that no power assist takes place.

Figure 4:
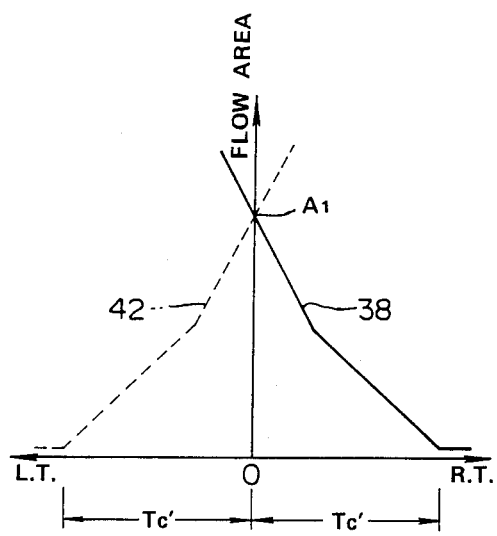
FIG. 4 is a chart that shows the relationship between the flow area and the steering torque.
Figure 5:
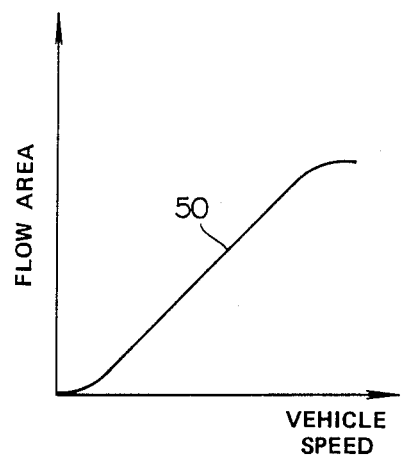
FIG. 5 is a chart that shows the relationship between the flow area and the vehicle speed.

If, now, the steering wheel 34 is turned to the right, the variable flow orifices 36, 38, and 44 decrease their flow areas, while the variable flow orifices 40, 42, and 46 increase their flow areas as shown in FIGS. 3 and 4, causing steering pressure to develop at the right turn outlet port 28, creating pressure differential acting on the power piston 20, thus causing the power piston 20 to assist right turn steering linkage operation. The degree of power assist increases as the steering torque increases.

The degree of power assist is determined by the steering hydraulic pressure. The magnitude of the steering hydraulic pressure if the steering wheel 34 is turned to the right is determined by combined equivalent flow area $A_C$ which can be expressed as, $$A_C = A_{36} + 1/\sqrt{1/A_{38}^2 + 1/(A_{44} + A_{50})^2} \quad (1)$$

where,
$A_{36}$: flow area of orifice 36;
$A_{38}$: flow area of orifice 38;
$A_{44}$: flow area of orifice 44;
$A_{50}$: flow area of vehicle sensitive orifice valve 50.

Since $A_{50}$ becomes zero as vehicle speed decreases to zero, the combined equivalent flow area $A_C$, when the vehicle speed is zero, can be expressed by the following equation, $$A_C = A_{36} + 1/\sqrt{1/A_{38}^2 + 1/A_{44}^2} \quad (2)$$

From comparison of the equation (2) with (1), it will be readily understood that with the same steering torque, the combined equivalent flow area progressively increases for the incremental increase in vehicle speed. This means that with the same steering torque the degree of power assist decreases as the vehicle speed increases (see curves "a", "b" and "c" in FIG. 10). It will now be appreciated from the charts shown in FIGS. 3 and 4 and the above equation (2) that when the vehicle speed is zero, the combined equivalent flow area $A_C$ varies in a predetermined pattern with respect to steering torque. But, as the vehicle speed increases, as will be appreciated from the chart shown in FIG. 5 and the equation (1), the variable flow orifice valve 50 changes the pattern of variation of the combined equivalent flow area $A_C$ to a different pattern which progressively varies for incremental change in vehicle speed.

Let us consider how to give the equation (2).

The pressure drop P by the orifices 38 and 44 connected in series is the sum of pressure drop $P_{38}$ due to the orifice 38 and pressure drop $P_{44}$ due to the orifice 44 which are expressed as, $$P_{38} = \frac{\rho}{2g} Q^2/A_{38}^2, \text{ and}$$

$$P_{44} = \frac{\rho}{2g} Q^2/A_{44}^2.$$

where,
$\rho$: specific weight of fluid;
g: gravitational acceleration;
Q: flow rate of fluid.

Thus, the pressure drop P due to both of the orifices 38 and 44 is given by, $$P = \frac{\rho}{2g} Q^2/A_{38}^2 + \frac{\rho}{2g} Q^2/A_{44}^2$$

$$= \frac{\rho}{2g} Q^2/\left(1/\sqrt{1/A_{38}^2 + 1/A_{44}^2}\right)^2$$

Thus, $$1/\sqrt{1/A_{38}^2 + 1/A_{44}^2}$$

is the combined equivalent flow area of the series connected orifices 38 and 44. Since the combined equivalent flow is the sum of respective flow areas of two orifices if they are connected in parallel, adding this combined equivalent flow area to the flow area $A_{36}$ of the orifice 36 gives the relationship expressed by the equation (2).

Figure 6:
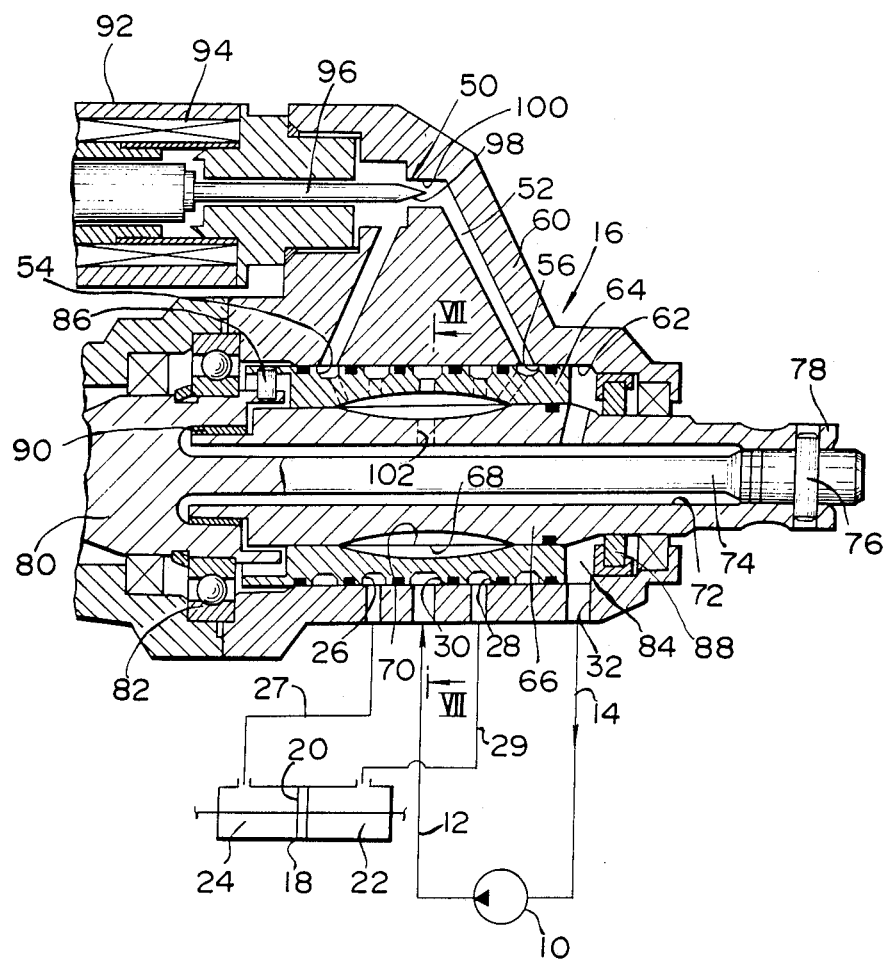
FIG. 6 shows one practical form of the valve structure of the steering control valve shown in FIG. 1.
Figure 7:
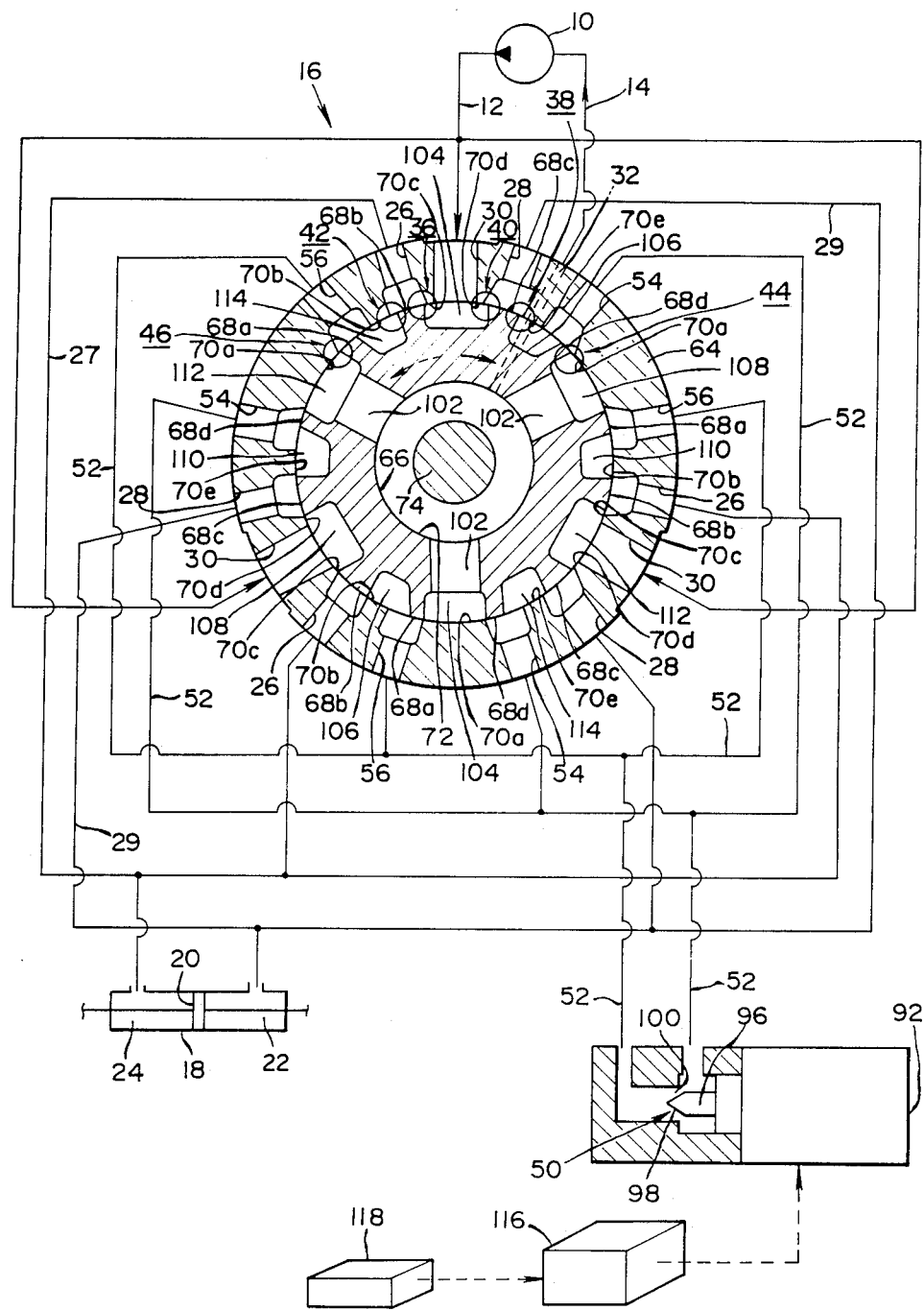
FIG. 7 is a schematic cross-sectional view taken through the line VII—VII of FIG. 6.

Referring to FIGS. 6 and 7, the valve structure of the control valve 16 is described. The steering control valve 16 includes a valve housing 60 having a circular opening 62 which receives a valve sleeve 64. Positioned in the valve sleeve 64 is an inner valve member 66. The inner valve member 66 includes valve lands 68 which register with internal valve lands 70 formed in the sleeve 64.

The sleeve 64 is ported at 30 to communicate with power steering pump supply passage 12. Side ports 54 and 56 are formed in the sleeve 64 and communicate with a bypass passage 52. A solenoid operated vehicle speed sensitive variable orifice valve 50 is disposed in the by passage 52. A left turn outlet port 26 communicates with a left turn passage 27 which in turn communicates with a chamber 24 of a fluid motor 18, and a right turn outlet port 28 communicates with a right turn passage 29 which in turn communicates with a chamber 22 of the fluid motor 18. The left turn and right turn outlet ports 26 and 28 are formed in the valve sleeve 64.

The inner valve member 66 has a central opening 72 which receives a torsion bar 74, the right end of which is pinned at 76 to a torque input shaft 78, the latter being connected to a driver controlled steering shaft with a steering wheel 34 (see FIG. 1). The left end of the torsion bar 74 is integrally connected to a pinion 80 which is adapted to engage a steering gear rack that in turn is connected to the steering gear linkage for the dirigible wheels of the vehicle. The pinion 80 is journalled by bearing 82 in the valve housing 60.

The central opening 72 communicates with space 84 which in turn communicates with flow return passage 14 through a port 32 formed in the valve housing 60. The valve sleeve 64 is connected to the pinion 80 by a pin 86. The sleeve 64 thereby rotates with the pinion 80. The inner valve member 66 is journalled in the valve housing 60 at its right end by bushing 88. The left end of the inner valve member 66 is rotatably received in the pinion 80 by a bushing 90.

The vehicle speed sensitive variable orifice valve 50 comprises a solenoid 92 with solenoid windings 94 and a plunger 96. The plunger 96 includes a tapered section 98 that registers with orifice 100 to provide a variable flow area for the fluid in the passage 52.

A radial passage 102 is formed in the inner valve member 66 and communicates at one end with the valve lands 68 and at the opposite end with the central opening 72.

In FIG. 7, there is shown a combined cross-sectional view the valve lands 68 which register with the internal valve lands 70 formed in the valve sleeve 64. The lands 68 of the inner valve member 66 are formed by six pairs 104, 106, 108, 110, 112, and 114 of grooves, each pair consisting of two diametrically opposed grooves. Thus, three sets of valve lands are formed, each set consisting of four lands 68a, 68b, 68c, and 68d. The internal valve lands 70 formed in the sleeve 64 consist of three sets of valve lands, each set consisting of five internal valve lands 70a, 70b, 70c, 70d, and 70e. As viewed in FIG. 7, the inner valve member 66 displaces clockwise (see the fully drawn arrow) relative to the valve sleeve 64 during right turn, while it displaces counterclockwise (see the broken line drawn arrow) during left turn. Each valve land 68b and the adjacent one internal land 70c define between their adjacent edges a variable flow area which forms a part of variable flow orifice 36 shown in FIG. 1. Since there are three such flow areas, each flow area is equal to one third of the flow area Ao of the variable flow area orifice 36 when the inner valve member 66 is on the center condition as illustrated. Each valve land 68c and the adjacent one internal land 70e define between their adjacent edges a variable flow area which forms a part of variable flow orifice 38 shown in FIG. 1. Since there are three such flow areas, each flow area is equal to one third of the flow area $A_1$ of the variable flow orifice 38 when the inner valve member 66 is on the center condition as illustrated. Each valve land 68c and the adjacent one internal land 70d define between their adjacent edges a variable flow area which forms a part of variable flow orifice 40 shown in FIG. 1. Since there are three such flow areas, each flow area is equals to one third of the flow area Ao of the variable flow orifice 40 when the inner valve member is on the center condition as illustrated. Each valve land 68b and the adjacent one internal land 70b define between their adjacent edges a variable flow area which forms a part of variable flow orifice 42. Since there are three such flow areas, each flow area is equal to one thirds of the flow area $A_1$ of the variable flow orifice 42. Each valve land 68d and the adjacent one internal land 70a define between their adjacent edges a variable flow area which forms a part of variable flow orifice 44. Since there are three such flow areas, each flow area is equal to one third of the flow area Ao of variable flow orifice 44. Each valve land 68a and the adjacent one internal land 70a define between their adjacent edges a variable flow area which forms a part of variable flow orifice 46. Since there are three such flow areas, each flow area is equal to one third of the flow area Ao of variable flow orifice 46.

There are three inlet ports 30 in the valve sleeve 64 which are 120° out of position with each other. All of them are identified by common reference numerals 30. Each inlet port 30 communicates with the pump output flow passage 12 and with the valve lands 68b and 68c. There are three flow return passages 102 formed in the inner valve member 66, each communicating at one end with two lands 68a and 68d and at the other end with the central opening 72. There are three left turn outlet ports 26 in the valve sleeve 64 which are 120° out of position with each other. Each left turn outlet port 26 communicates with left turn passage 27 and with valve land 68b. There are three right turn outlet port 28 which are 120° out of position with each other. Each right turn outlet port 28 communicates with right turn passage 29 and with valve land 68c. There are three bypass ports 54 which are 120° out of position one after another. Each bypass port 54 communicates with bypass passage 52 and with valve land 68d. There are three bypass ports 56 which are 120° out of position with each other. Each bypass port 56 communicates with bypass passage 52 and with valve land 68a.

The flow area of the vehicle speed sensitive variable orifice valve 50 is increased by electromagnetic force produced by the solenoid windings 92. Since the solenoid windings 92 produce electromagnetic force which increases in proportion to the magnitude of electric current passing therethrough, the flow area of the orifice valve 50 increases in proportion to the magnitude of solenoid electric current. The magnitude of electric current passing through the solenoid windings 92 is controlled by a control module 116 in response to vehicle speed signal generated by a vehicle speed sensor 118 such that the flow area increases as vehicle speed increases in the manner as shown in FIG. 5.

Figure 8:
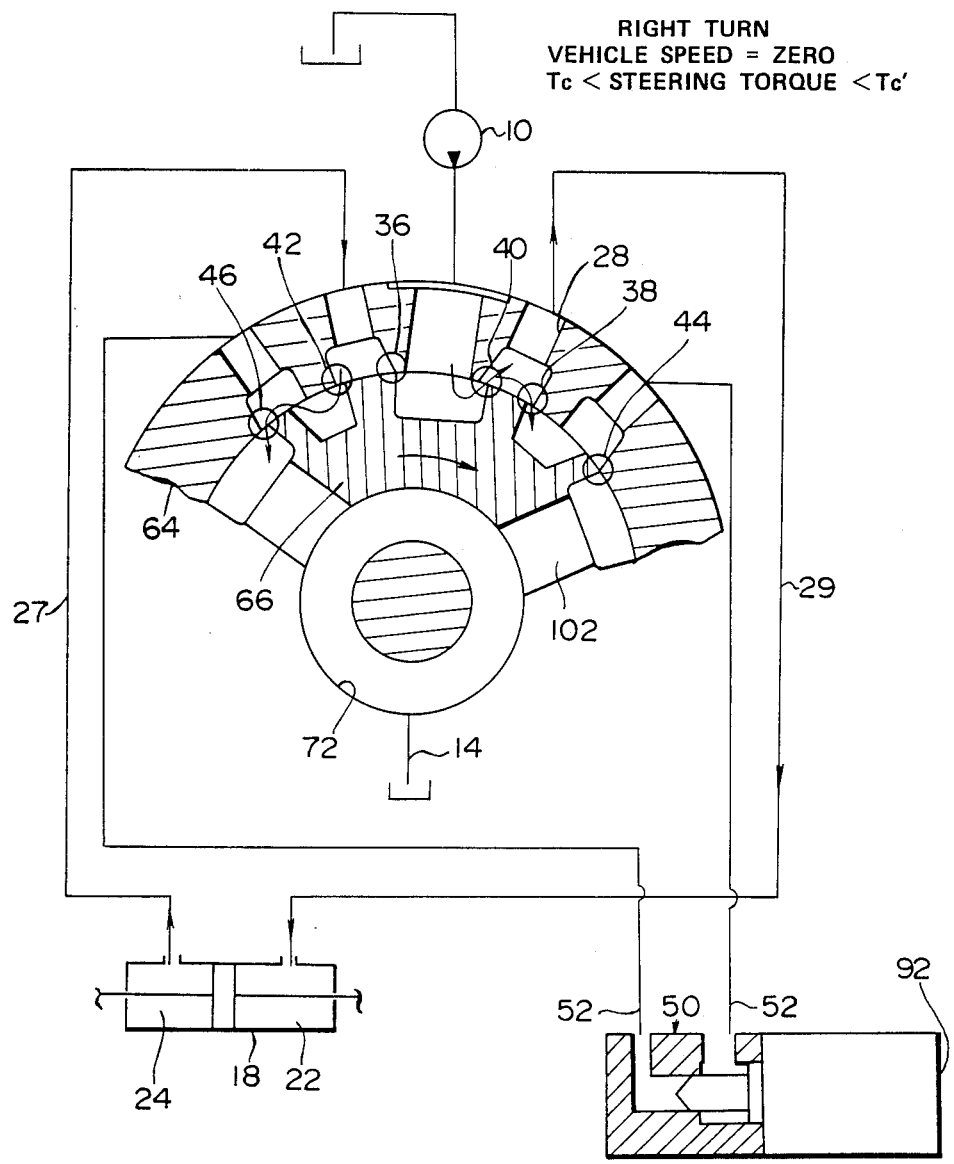
FIG. 8 is a fragmentary enlarged view of FIG. 7 showing the position of parts assumed upon right turn at zero vehicle speed.
Figure 10:
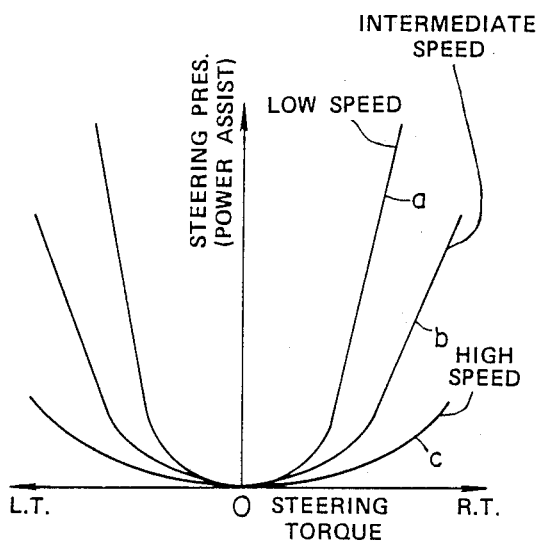
FIG. 10 is a chart that shows the relationship of steering pressure (i.e., power assist pressure) to steering torque for various vehicle speeds.

FIG. 8 is a fragmentary sectional view showing the position of parts assumed upon right turn at zero vehicle speed. Under this condition, the vehicle speed sensitive variable orifice valve 50 is closed, so that the fluid flow through the passage 52 is blocked. The right turn of the steering wheel 34 causes clockwise rotational movement of the inner valve member 66 relative to the outer sleeve 64, causing the orifices 36, 38, and 44 to reduce their flow areas. Since the amount of this clockwise relative rotation of the inner valve member 66 is variable with the magnitude of the steering torque, the flow areas of the orifices 36 and 44 reduce as shown by the fully drawn line in FIG. 3 and the flow area of the orifice 38 reduces as shown by the fully drawn line in FIG. 4 as the steering torque increases. The fluid discharged by the pump 10 flows via the orifice 40 to the right turn outlet port 28, and then into the right turn passage 29 leading to the chamber 22 of the power cylinder 18. Since two orifices 38 and 44 are fluidly disposed in series between the right turn outlet port 28 and the flow return passage 14 on right turn with vehicle speed zero, the power assist pressure building up at the right turn outlet port 28 increases as the steering torque increases. Thus, the power assist is variable with the steering torque. More specifically, after the steering torque increases beyond the value Tc (see FIG. 3 also) when the flow areas of the orifices 36 and 44 are minimum or substantially zero, the maximum power assist pressure is allowed to build up at the right turn outlet port 28. Thus, the characteristic curve "a" as shown in FIG. 10 is given. It will be readily understood that the orifices 40, 42, and 46 increase their flow areas and thus do not serve as fluid flow restrictors during operation at right turn.

Figure 9:
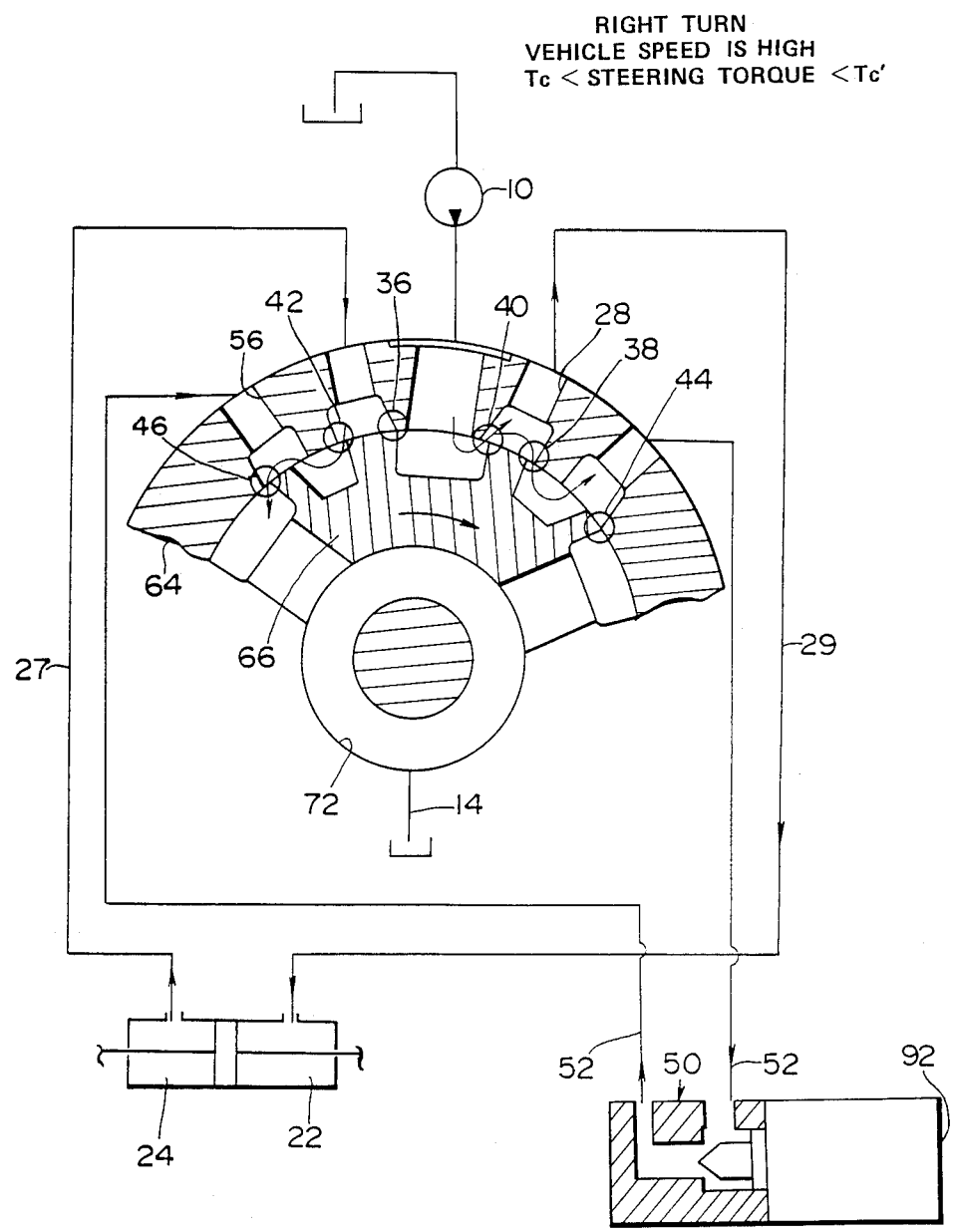
FIG. 9 is a similar view to FIG. 8 but upon right turn at vehicle speed higher than zero.

Referring to FIG. 9, let us now consider the case where the steering wheel 34 is turned to the right at intermediate and high vehicle speeds. The vehicle speed sensitive orifice valve 50 gradually increases its flow area (see FIG. 5) so that the effective fluid flow area of the passage 52 increases accordingly.

If the vehicle speed is high and thus the vehicle speed sensitive orifice valve 50 is fully opened, the flow restriction on fluid flow from the right turn outlet port 28 to the flow return passage 14 is determined by the flow area of the orifice 38 only. In this case, since the power assist pressure is suppressed, the characteristic as shown by the fully drawn curve "c" shown in FIG. 10 is given.

If the vehicle speed is intermediate between low and high speeds, since the flow area provided by the vehicle speed sensitive variable orifice valve 50 is variable with the vehicle speed as shown in FIG. 5, the above mentioned flow restriction is determined by the flow areas of orifices 38 and 50. Thus the characteristic as shown by the fully drawn curve "b" shown in FIG. 10 is given.

From the above description, it will be understood that with the same steering torque, the power assist decreases as the vehicle speed increases.

If, at high vehicle speeds, the steering torque increases beyond the value Tc', the maximum power assist is produced because the flow area of the orifice 38 is minimum and substantially zero under this condition (see FIG. 4).

In the above mentioned embodiment, the flow area of the variable orifice valve 50 is controlled in response to vehicle speed, it may be controlled taking the following into account.

(1) The control module 116 is operatively coupled to a wiper switch such that the solenoid current is increased as the wiper speed increases thereby decreasing the degree of power assist as rain gets heavy. This is effective in reducing risk due to inadvertent quick steering which otherwise might occur during running through heavy rain.

(2) The solenoid current is increased as speed difference between vehicle driving wheels and non-driving wheels increases, i.e., in the case where the vehicle is likely to slip. Controlling the solenoid current in this manner will reduce risk due to inadverdent quick steering which otherwise might occur during running through snow road or frozen road.

(3) The control module 116 is designed to be accessible by a driver such that the driver can select one of various magnitudes of solenoid current so as to fit the degree of power assist to his preference.

(4) The control module 116 is designed to judge the vehicle's running condition by detecting the frequency of occurrence of acceleration and deceleration which the vehicle body is subject to and change the magnitude of solenoid current.

(5) The magnitude of solenoid current is changed in accordance with judgment based on steering wheel angle and the speed at which the steering wheel is turned.

(6) The magnitude of solenoid current is changed based on the load imposed on dirigible wheels.

Figure 11:
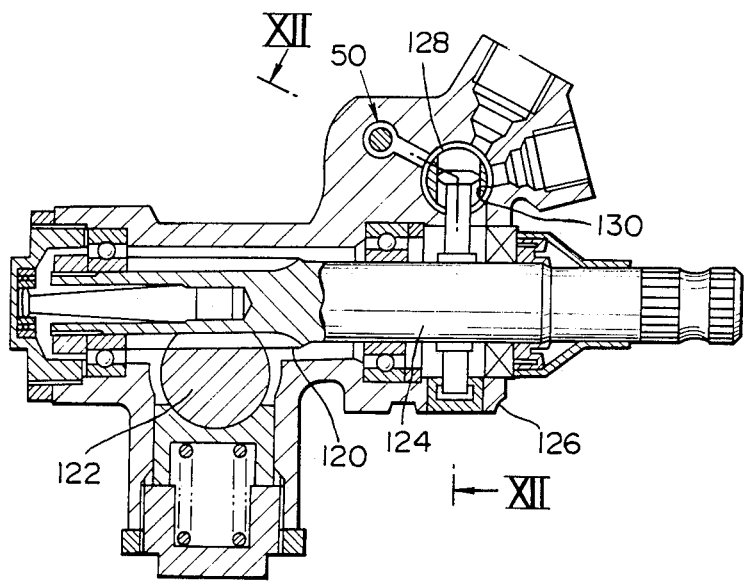
FIG. 11 shows another practical form of the steering control valve shown in FIG. 1.
Figure 12:
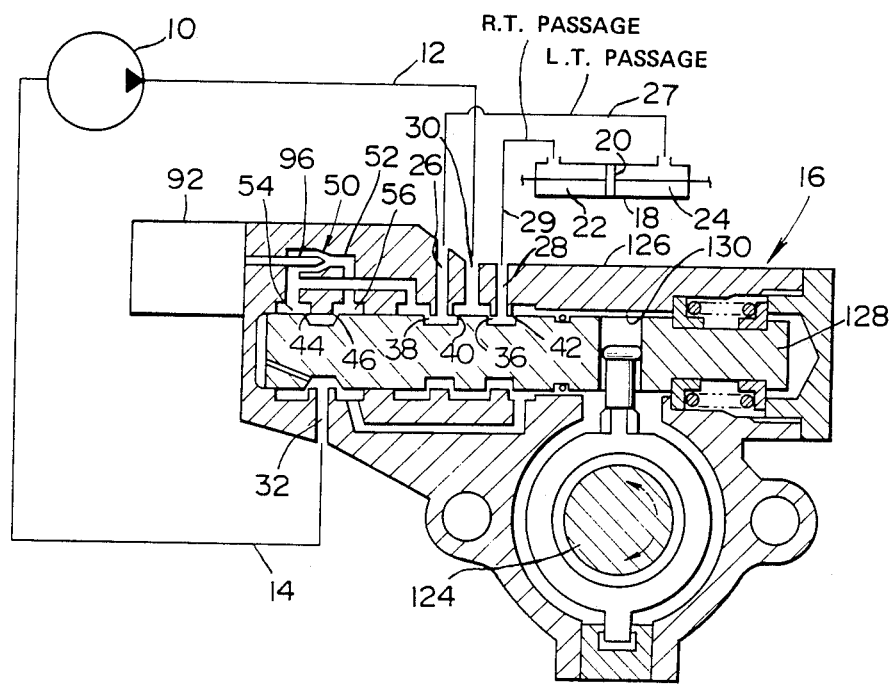
FIG. 12 is a schematic cross-sectional view taken through the line XII—XII of FIG. 11.

Referring to FIGS. 11 and 12, there is shown a spool type control valve embodying the present invention. Reference numeral 120 designates a pinion which is engaged with a rack 122 of a vehicle steering linkage. The pinion 120 is formed at one end portion of a steering torque input shaft 124 rotatably supported in a valve body 126. A spool 128 is slidably disposed in a valve bore 130 formed in the valve body 126. As shown in FIG. 12, the spool 128 moves to the right as the steering input shaft 124 turns clockwise as shown by the fully drawn arrow during right turn, and the spool 128 moves to the left as the steering input shaft 124 turns counterclockwise as shown by the broken line drawn arrow during left turn. The spool 128 is formed with valve lands which register with internal lands formed in the wall of the valve bore 130 to define variable flow orifices 36, 38, 40, 42, 44, and 46. For ease of understanding, the same reference numerals as used in FIG. 1 are employed herein to designate not only like variable flow orifices, but also like other parts which have the same functions as their counterparts in FIG. 1.

Figure 13:
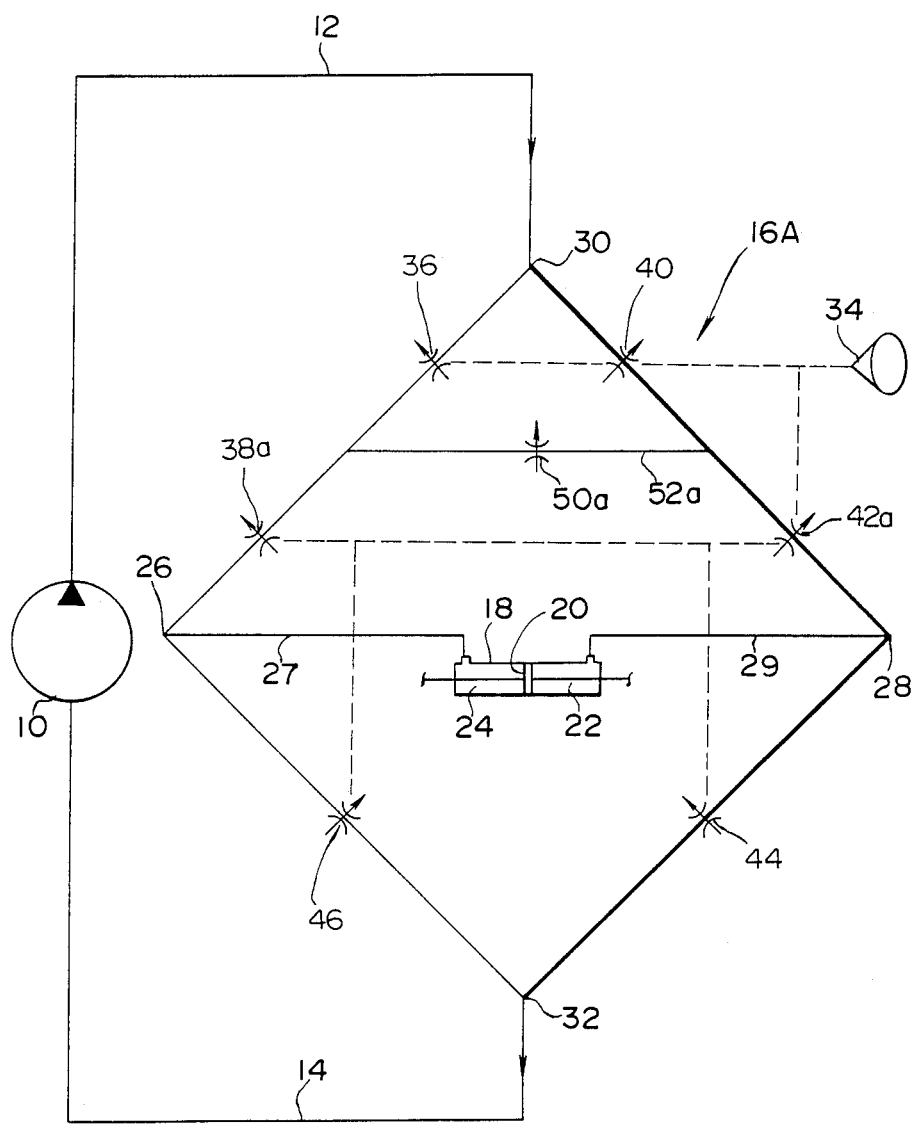
FIG. 13 is a similar illustration to FIG. 1 showing another embodiment according to the present invention.

FIG. 13 shows another embodiment of a control valve 16A. This embodiment is substantially the same as the first embodiment shown in FIG. 1 except that a variable flow orifice 38a is fluidly disposed between the left turn outlet port 26 and a variable flow orifice 36, a variable flow orifice 42a is fluidly disposed between the right turn outlet port 28 and a variable flow orifice 40, and a variable orifice valve 50a is fluidly disposed in a bypass passage 52a having one end communicating with a portion between the variable flow orifices 40 and 42a and the opposite end communicating with a portion between the variable flow orifices 36 and 38a. The variable orifice 38a, 42a and the variable orifice valve 50a have replaced the variable flow orifices 38, 42 and the variable orifice valve 50 shown in FIG. 1.

Figure 14:
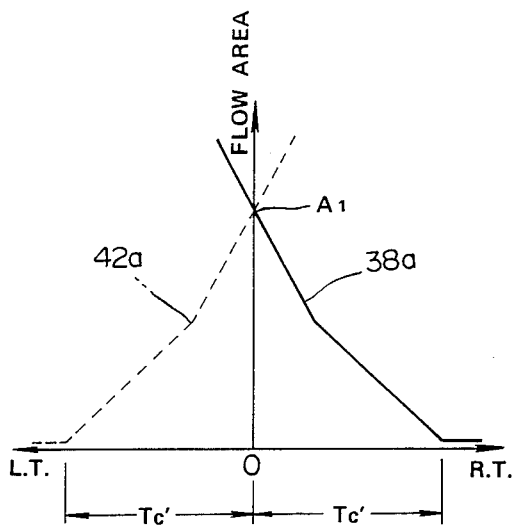
FIG. 14 is a chart that shows the relationship between the flow area and the steering torque.
Figure 15:
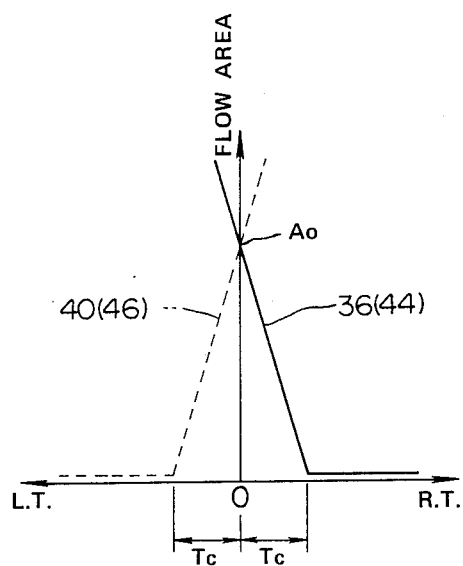
FIG. 15 is a chart that shows the relationship between the flow area and the steering torque.

In this embodiment shown in FIG. 13, as different from the characteristics of the variable flow orifices shown in FIGS. 2 and 3, the variable flow orifices 36, 38a, 40, 42a, 44, and 46 have the characteristics as shown in FIG. 14 and 15. The characteristic of the variable orifice valve 50a are the same as its counterpart 50 shown in FIG. 1.

Figure 16:
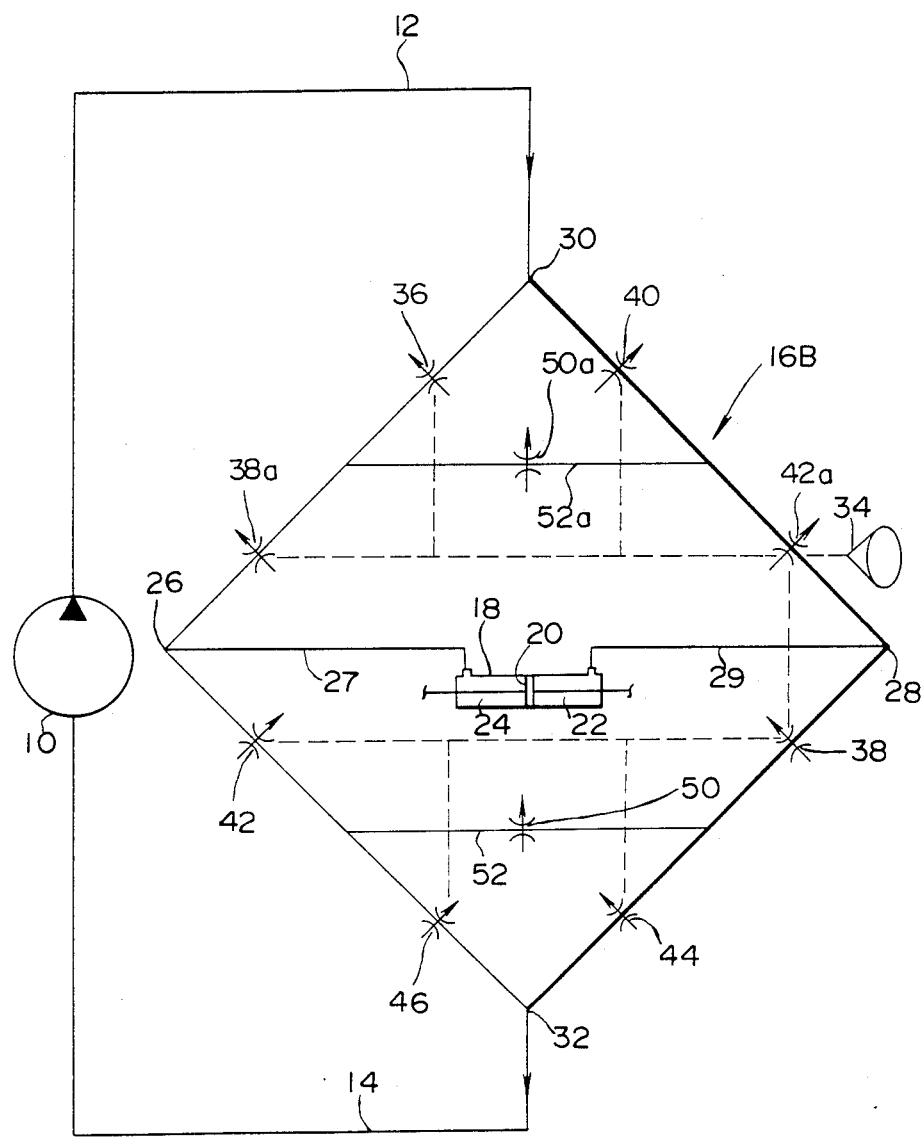
FIG. 16 is a similar illustration to FIG. 1 showing still another embodiment according to the present invention.
Figure 17:
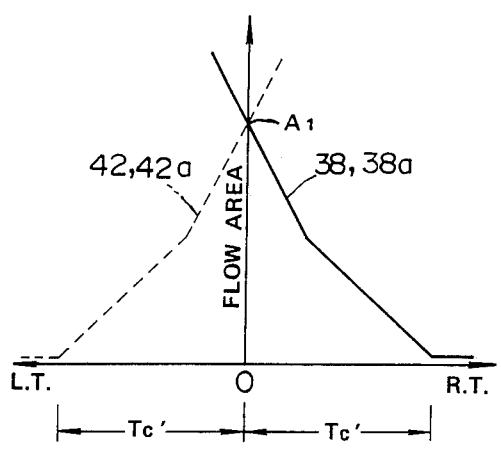
FIG. 17 is a chart that shows the relationship between the flow area and the steering torque.
Figure 18:
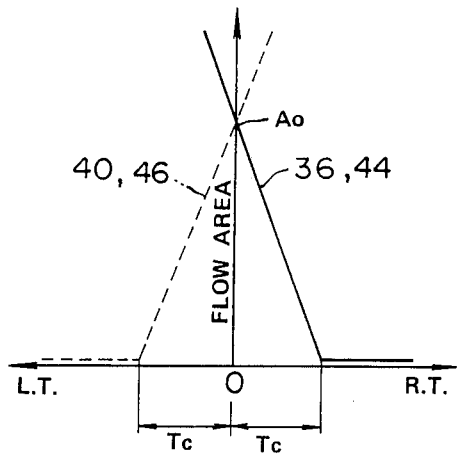
FIG. 18 is a chart that shows the relationship between the flow area and the steering torque.
Figure 19:
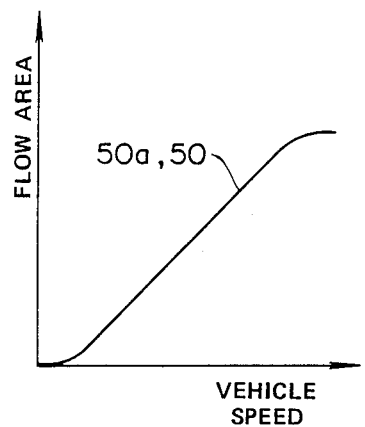
FIG. 19 is a chart that shows the relationship between the flow area and the vehicle speed.

FIG. 16 shows still another embodiment of a control valve 16B. This embodiment is different from the first embodiment shown in FIG. 1 in that variable flow orifices 38a, 42a and a variable orifice valve 50a are added and disposed in the same manner as the embodiment shown in FIG. 13. The variable flow orifices 38, 38a and 42, 42a have characteristics as shown in FIG. 17 which is the same as FIG. 4. The variable flow orifices 36, 44 and 40, 46 have characteristics as shown in FIG. 18 which is the same as FIG. 3. The variable orifice valves 50, 50a have characteristic as shown in FIG. 19 which is the same as FIG. 5.

Figure 20:
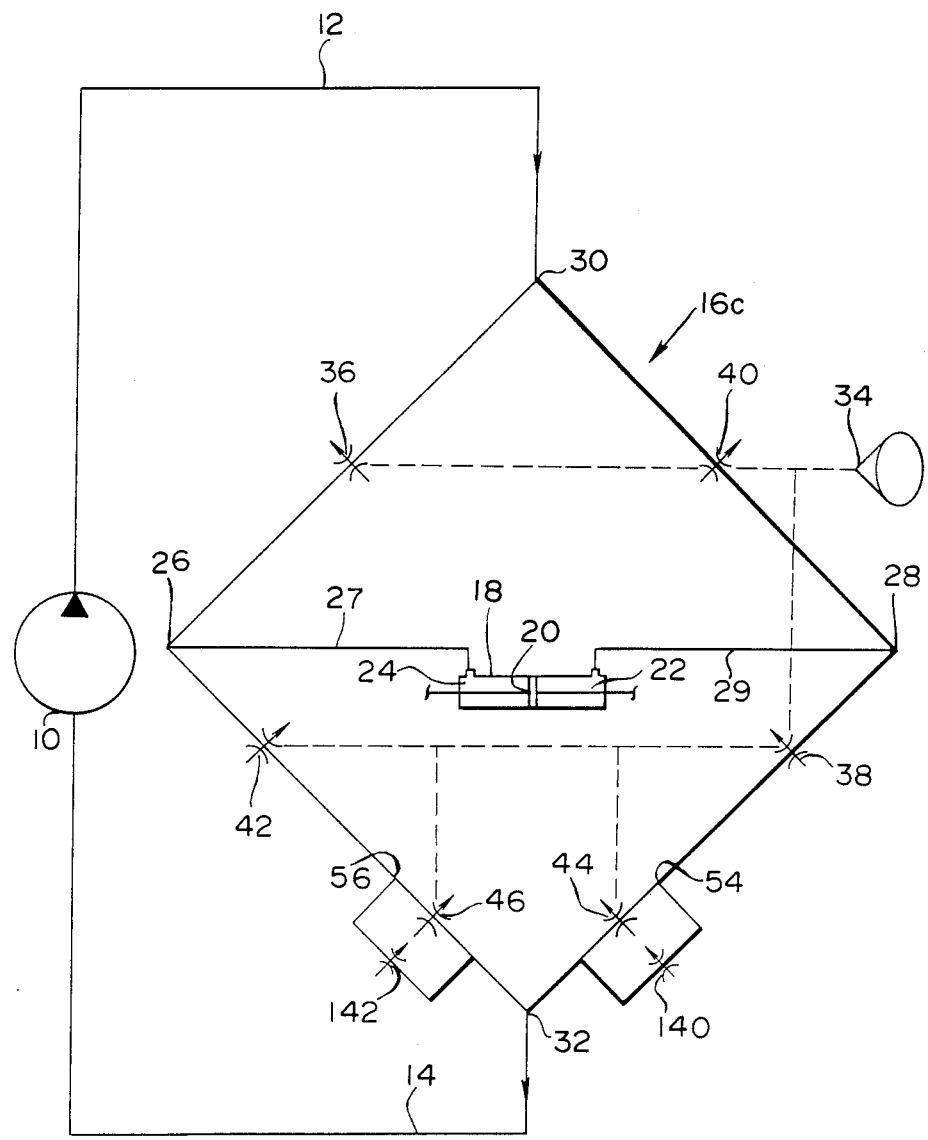
FIG. 20 is a similar illustration to FIG. 1 showing further embodiment according to the present invention.

FIG. 20 shows till another embodiment of a control valve 16C. This embodiment is substantially the same as the embodiment shown in FIG. 1, but the former is different from the latter in that instead of the variable orifice valve 50 arranged in parallel to both of the variable flow orifices 44 and 46, two variable orifice valves 140 and 142 are arranged in parallel to variable flow orifices 44 and 46, respectively. In this embodiment, both of the variable orifice valves 140 and 142 have the common flow area vs., vehicle speed characteristic which is the same as that shown in FIG. 5.

Figure 21:
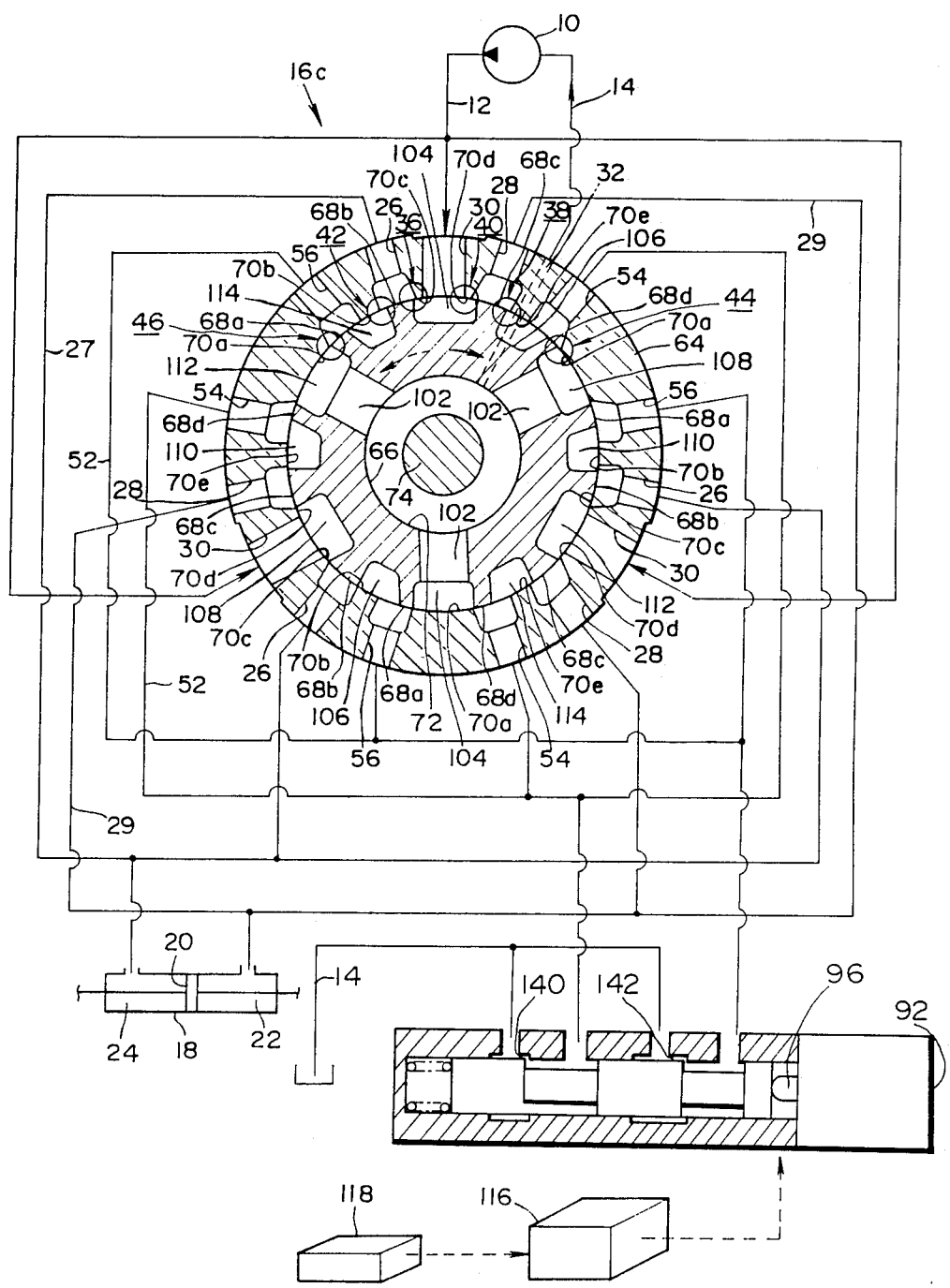
FIG. 21 is a schematic cross-sectional view similar to FIG. 7 illustrating a steering control valve employing the hydraulic circuit shown in FIG. 20.

FIG. 21 shows the valve structure of the control valve 16C shown in FIG. 20. The valve structure shown herein is substantially the same as that shown in FIG. 7 except that ports 54 and 56 are connected to variable orifice valves identified by reference numerals 140 and 142 of a valve structure including solenoid windings 92.

Figure 22:
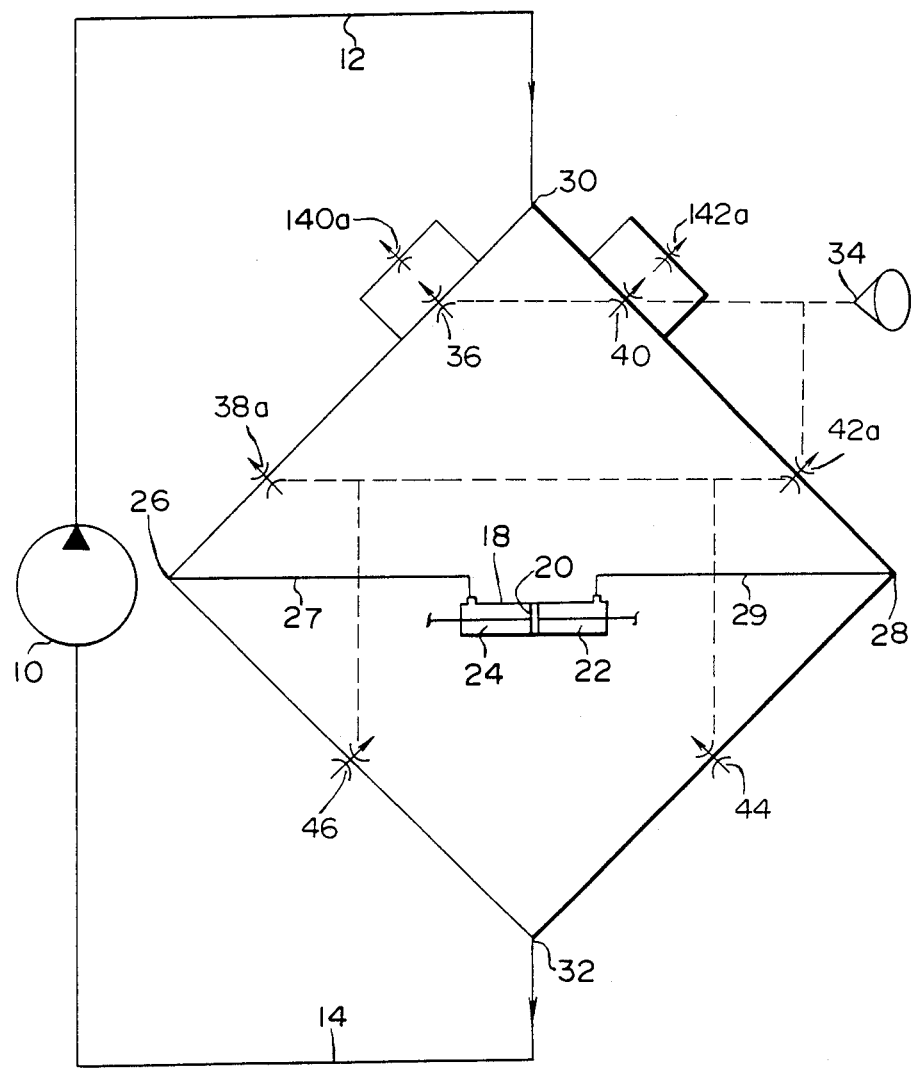
FIG. 22 is a similar illustration to FIG. 20 showing a further embodiment according to the present invention.

FIG. 22 shows another embodiment which is substantially the same as the embodiment shown in FIG. 13 except the provision of two variable orifice valves 140a and 142a which are arranged in parallel to variable flow orifices 44a and 46a, respectively, in the place of the single variable orifice valve 50a shown in FIG. 13. The variable orifice valves 140a and 142a have the common characteristic which is the same as FIG. 5.

Figure 23:
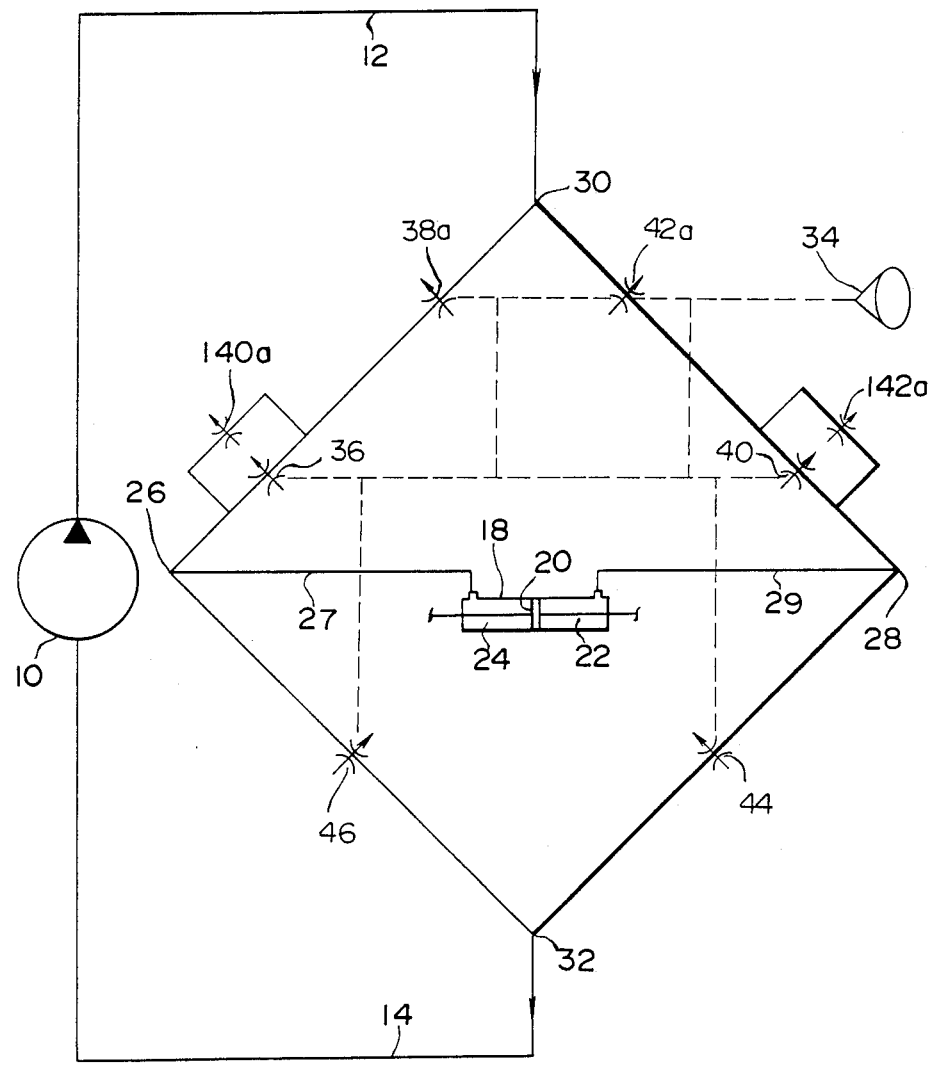
FIG. 23 is a similar illustration to FIG. 20 showing another embodiment according to the present invention.

FIG. 23 shows an embodiment which is different from the embodiment shown in FIG. 13 in that the variable orifices 36 and 40 have been shifted to the locations between the variable orifice 38a and the left turn outlet port 26 and between the variable flow orifice 42a and the right turn outlet port 28 and the variable orifice valves 140a and 142a are arranged in parallel to these variable flow orifices 36 and 40, respectively.

Figure 24:
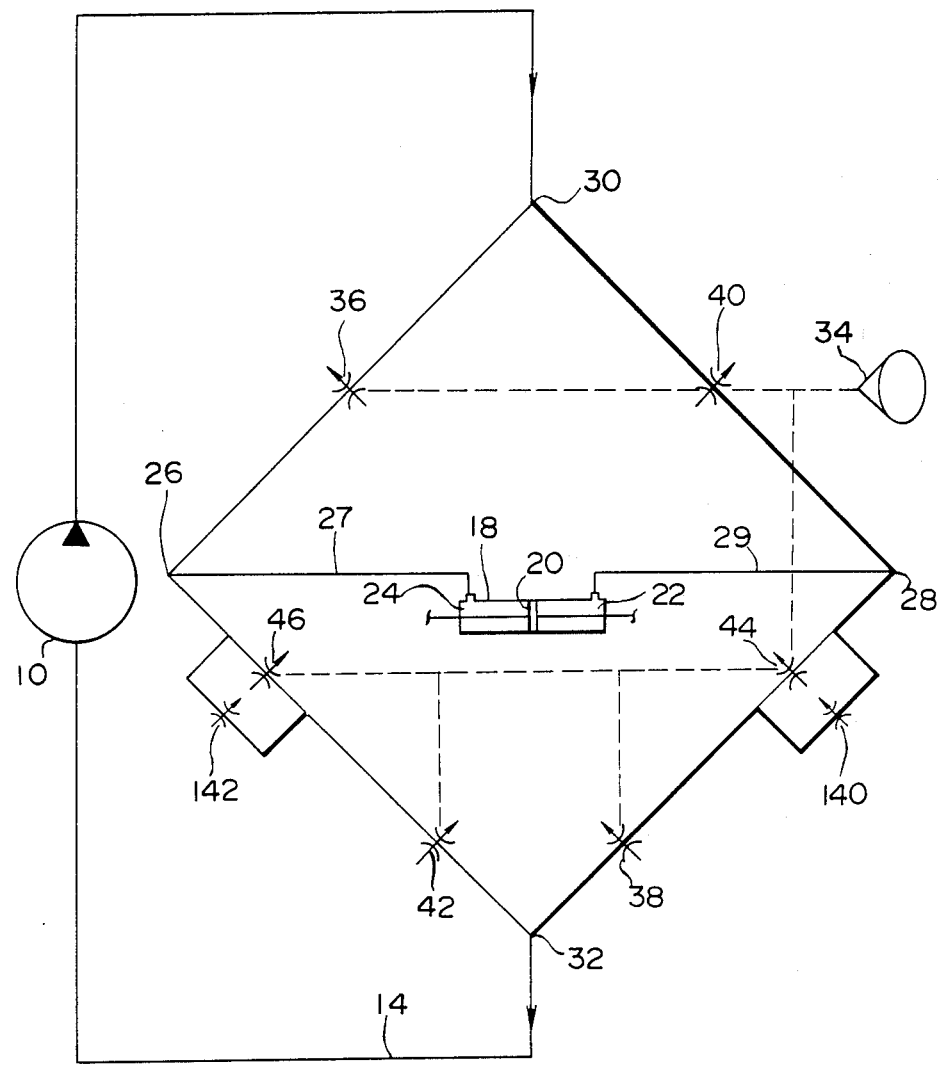
FIG. 24 is a similar illustration to FIG. 20 showing a further embodiment according to the present invention.

FIG. 24 shows an embodiment which is different from the embodiment shown in FIG. 20 in that the variable flow orifices 44 and 46 have been shifted to the locations between the right turn outlet port 28 and the variable flow orifice 38 and between the left turn outlet port 26 and the variable flow orifice 42 and the variable orifice valves 140 and 142 are arranged in parallel to these variable flow orifices 44 and 46, respectively.

Figure 25:
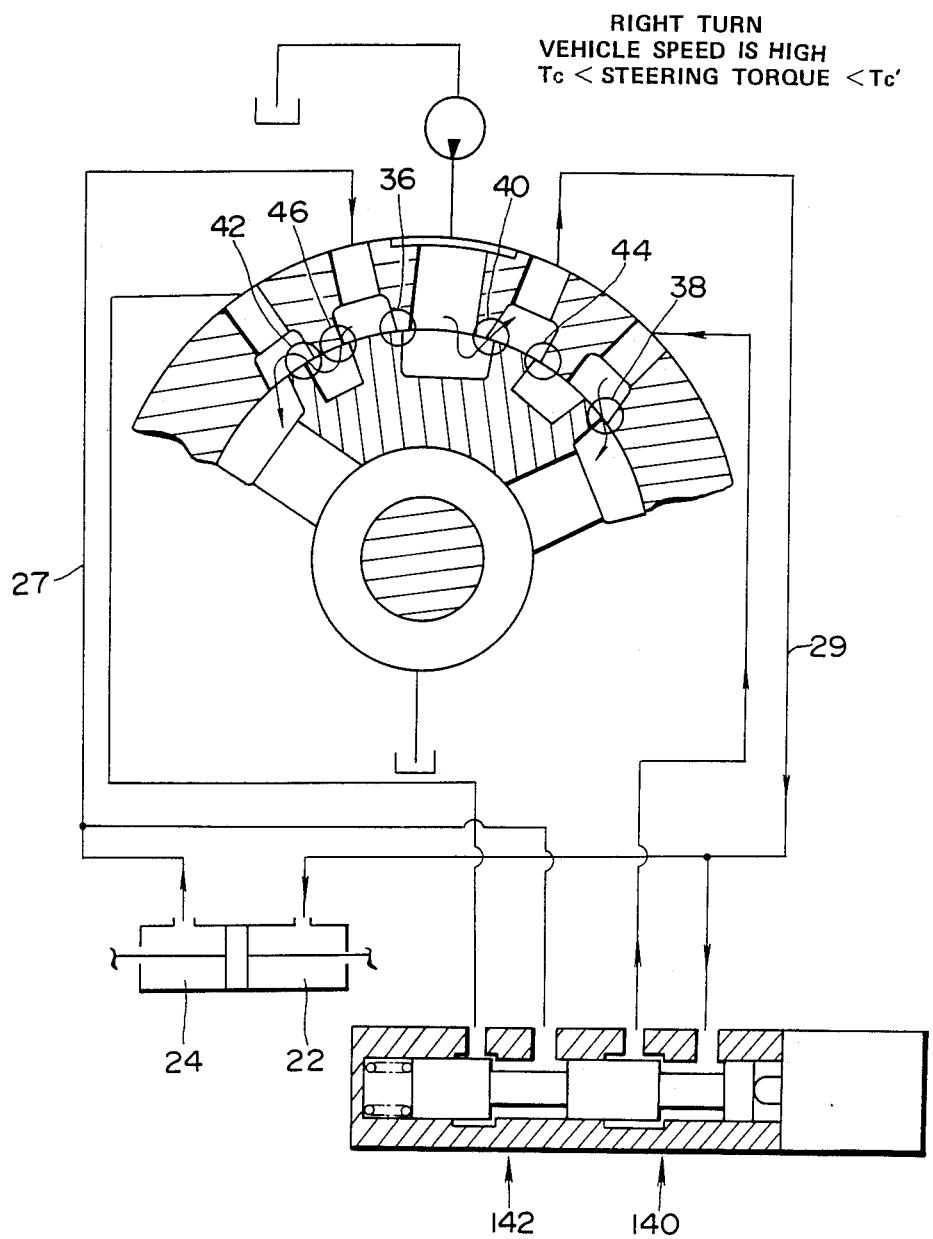
FIG. 25 is a fragmentary enlarged view of FIG. 24 showing the position of parts assumed by the control valve shown in FIG. 24 when the steering torque is larger than Tc but smaller than Tc at high vehicle speed.

FIG. 25 shows the position of parts assumed by the control valve shown in FIG. 24 when the steering torque is larger than Tc but smaller than Tc' at high vehicle speed.

Figure 26:
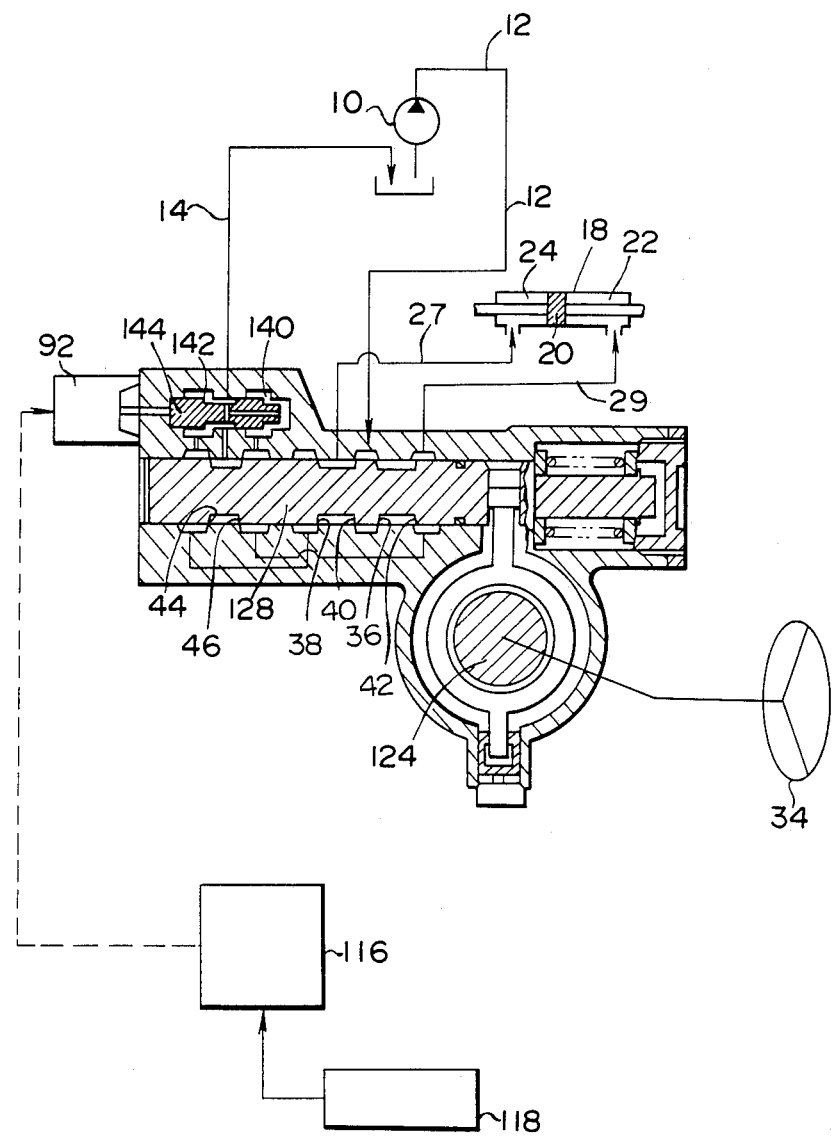
FIG. 26 shows in a schematic form a steering control valve employing the hydraulic circuit shown in FIG. 20.

FIG. 26 shows another valve structure of the control valve 16C shown in FIG. 20. The valve structure shown herein is substantially the same as that shown in FIG. 12 except that instead of the plunger 96 a spool 144 with two lands thereon is used. The lands of this spool 144 define two variable orifices 140 and 142. As shown, the spool 144 is formed with axial and radial passages through which the variable orifice 140 is allowed to communicate with flow return passage 14. For ease of understanding the same reference numerals as used in FIG. 12 are used herein to designate like parts.

Referring next to FIGS. 27 to 30, the other four embodiments are hereinafter described.

Figure 27:
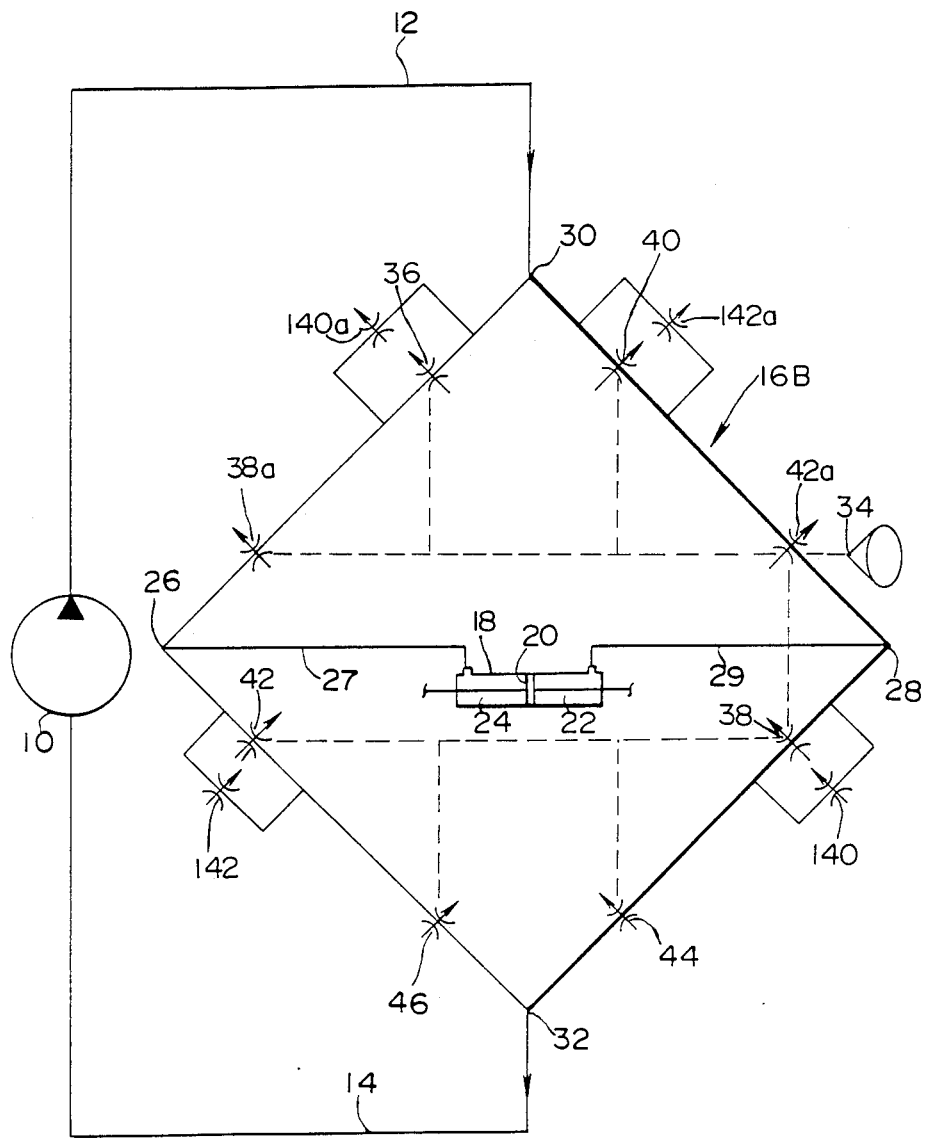
FIGS. 27 to 30 are illustrations showing four further embodiments.

FIG. 27 shows an embodiment which is similar to FIG. 22 embodiment except that a variable flow orifice 38 is fluidly disposed between the right turn outlet port 28 and a variable flow orifice 44, a variable flow orifice 42 is fluidly disposed between the left turn outlet port 26 and two variable flow orifice valves 140 and 142 are arranged in parallel to the variable flow orifices 38 and 42, respectively.

Figure 28:
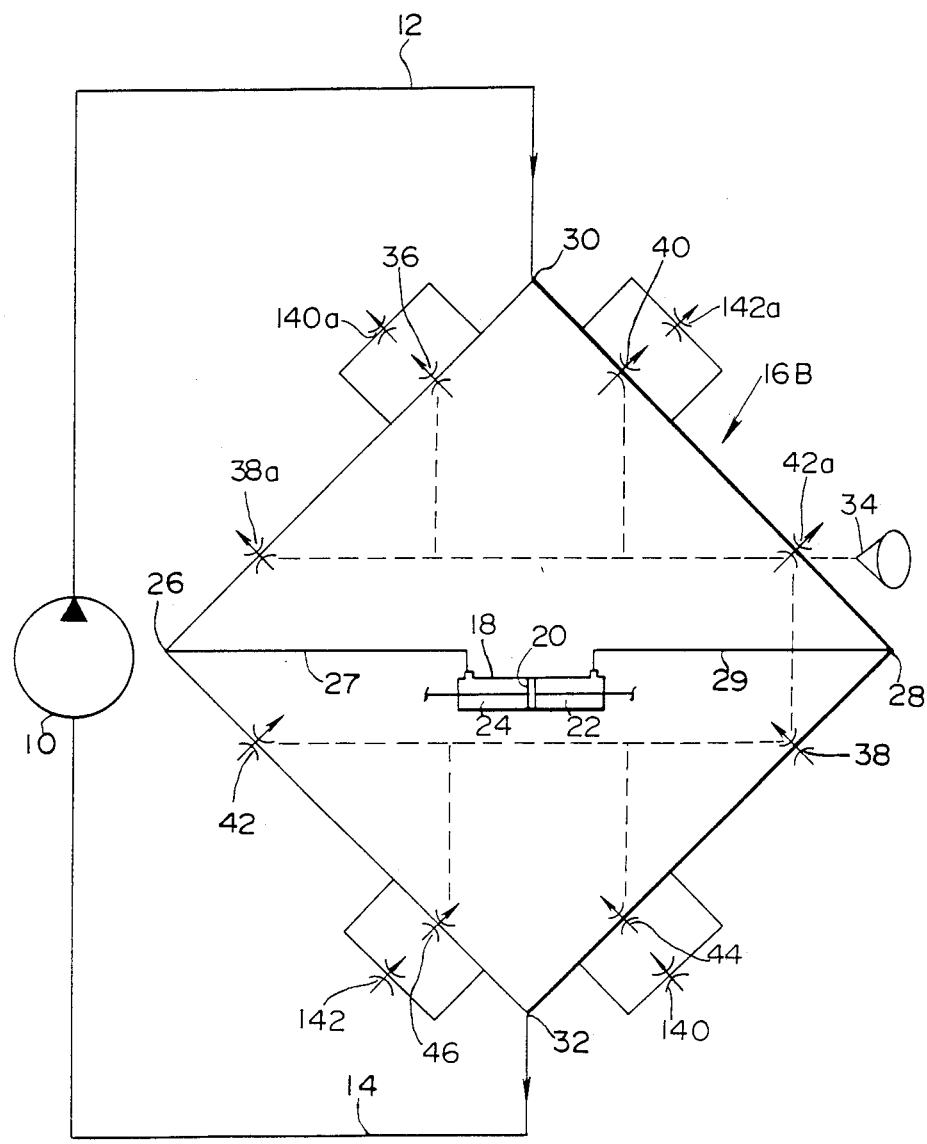

FIG. 28 shows an embodiment which is similar to FIG. 27 embodiment except that two variable flow orifice valves 140 and 142 are arranged in parallel to variable flow orifices 44 and 46, respectively, rather than variable flow orifices 38 and 42.

Figure 29:
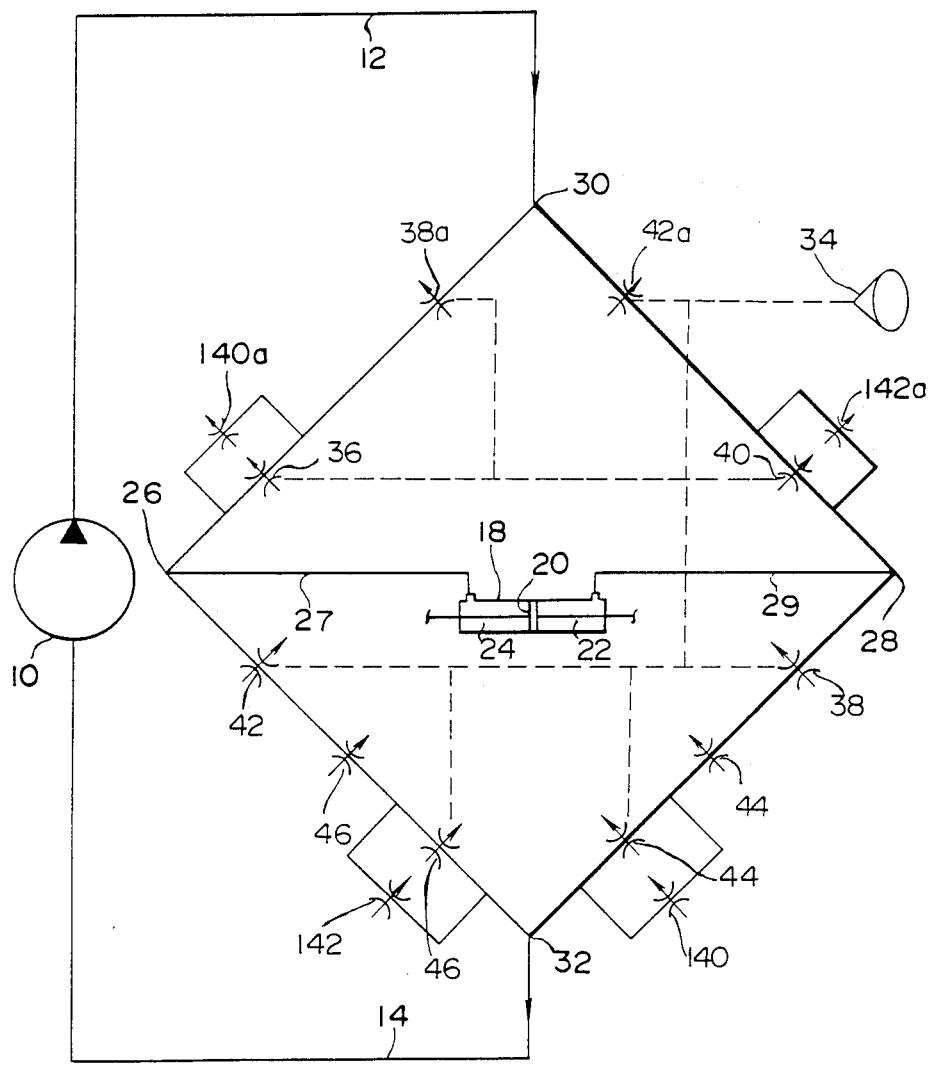

FIG. 29 shows an embodiment which is similar to FIG. 28 embodiment except that a variable flow orifice 38a is fluidly disposed between an inlet port 30 and a variable flow orifice 36 and a variable flow orifice 42a is fluidly disposed between the inlet port 30 and a variable flow orifice 40 as different from the disposition of the counterparts in FIG. 28 embodiment.

Figure 30:
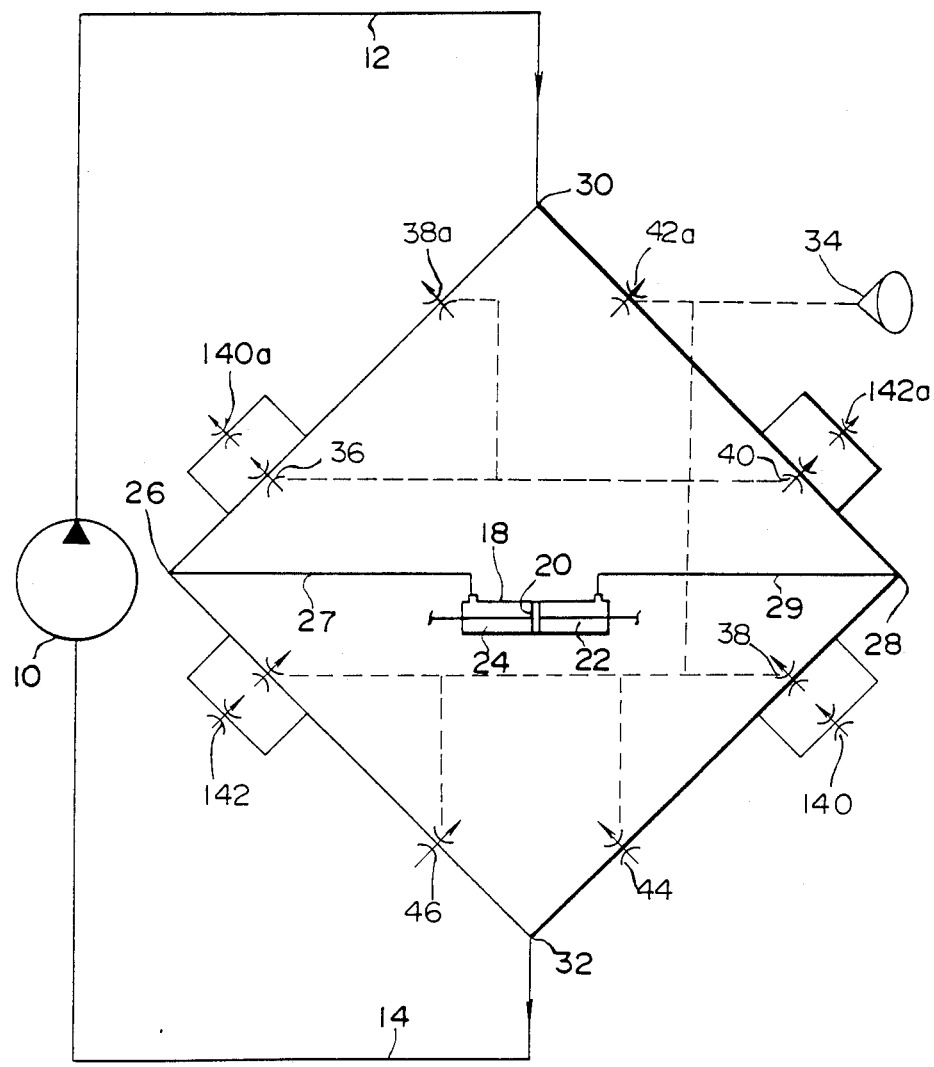

FIG. 30 shows an embodiment which is similar to FIG. 29 embodiment except that two variable orifice valves 140 and 142 are arranged in parallel to variable flow orifices 38 and 42 rather than variable flow orifices 44 and 46, respectively.

What is claimed is:

1. A steering control valve for a power steering system for a vehicle, the power steering system including a pump as a source of fluid flow, and a fluid motor adapted to be connected to a steering linkage of the vehicle, the steering control valve comprising:

an inner valve member;
a surrounding sleeve, said surrounding sleeve having a fluid flow inlet port communicating with the pump, a fluid flow return port, a left turn outlet port, and a right turn outlet port, said left turn and right turn outlet ports communicating with the fluid motor;
said inner valve member having formed thereon a set of valve lands, said surrounding sleeve having a set of internal lands registering with said set of valve lands;
said inner valve member being movable relative to said surrounding sleeve upon application of an input torque to said inner valve member;
said set of valve lands cooperating with said set of internal lands to define a plurality of variable flow orifices fluidly disposed between said fluid flow inlet port and said fluid flow return port, said plurality of variable flow orifices varying their flow areas as said inner member moves relative to said surrounding sleeve in response to said input torque applied thereto to cause hydraulic fluid pressures to develop at said left turn and right turn outlet ports to effect pressure differential forces acting on the fluid motor;
said plurality of variable flow orifices consisting of and being divided into a first group of variable flow orifices and a second group of variable flow orifices,
said first group of variable flow orifices decreasing their flow areas and being arranged so as to be effective in development of the hydraulic fluid pressure at said right turn outlet port as said inner member moves in one direction relative to said surrounding sleeve;
said second group of variable flow orifices decreasing their flow areas and being arranged so as to be effective in development of hydraulic fluid pressure at said left turn outlet port as said inner member moves in the opposite direction relative to said surrounding sleeve; and
a variable flow orifice valve means fluidly disposed between said fluid flow inlet port and said fluid flow return port, said variable flow orifice valve means connected in series with at least one of each of said first and second group of variable flow orifices, said variable low orifice valve means being responsive to vehicle control exclusive of said input torque applied to said inner valve member.

2. The steering control valve as claimed in claim 1, wherein said first group of variable flow orifices include a first variable flow orifice disposed between said fluid flow inlet port and said left turn outlet port, and series connected second and third variable flow orifices fluidly disposed between said right turn outlet port and said fluid flow return port;

said second group of variable flow orifices include a first variable flow orifice disposed between said fluid flow inlet port and said right turn outlet port, and series connected second and third variable flow orifices fluidly disposed between said left turn outlet port and said fluid flow return port; and wherein said variable flow orifice valve means has one end connected to a portion between said series connected second and third variable flow orifices of said first group and an opposite end connected to a portion between said series connected second and third variable flow orifices of said second group.

3. A steering control valve as claimed in claim 1, wherein said first group of variable flow orifices include series connected first and second variable flow orifices fluidly disposed between said fluid flow inlet port and said left turn outlet port, and a third variable flow orifice fluidly disposed between said right turn outlet port and said fluid flow return port;

said second group of variable flow orifices include series connected first and second variable flow orifices fluidly disposed between said fluid flow inlet port and said right turn outlet port, and a third variable flow orifice fluidly disposed between said left turn outlet port and said fluid flow return port; wherein said variable flow orifice valve means has one end connected to a portion between said series connected first and second variable flow orifices of said first group and an opposite end connected to a portion between said series connected first and second variable flow orifices of said second group.

4. A steering control valve as claimed in claim 1, wherein said first group of variable orifices include series connected first and second variable flow orifices fluidly disposed between said fluid flow inlet port and said left turn outlet port, and series connected third and fourth variable flow orifices fluidly disposed between said right turn outlet port and said fluid flow return port;

said second group of variable flow orifices include series connected first and second variable flow orifices fluidly disposed between said fluid flow inlet port and said right turn outlet port, and series connected third and fourth variable orifices fluidly disposed between said left turn outlet port and said fluid flow return port; and wherein said variable flow orifice valve means defines a first variable flow orifice and a second variable flow orifice; said first variable flow orifice defined by said variable flow orifice valve means has one end connected to a portion between said series connected third and fourth variable flow orifices of said first group and an opposite end connected to a portion between said series connected third and fourth variable flow orifices of said second group; said second variable flow orifice defined by said variable flow orifice valve means has one end connected to a portion between said series connected first and second variable flow orifices of said first group and an opposite end connected to a portion between said series connected first and second variable flow orifices of said second group.

5. A steering control valve as claimed in claim 1, wherein said first group of variable flow orifices include a first variable flow orifice disposed between said fluid flow inlet port and said left turn outlet port, and series connected second and third variable flow orifices fluidly disposed between said right turn outlet port and said fluid flow return port;

said second group of variable flow orifices include a first variable flow orifice disposed between said fluid flow inlet port and said right turn outlet port, and series connected second and third variable flow orifices fluidly disposed between said left turn outlet port and said fluid flow return port; and wherein said variable flow orifice valve means defines a first variable flow orifice and a second variable flow orifice, each being connected in series with one of said series connected second and third variable flow orifices of each of said first and second groups and connected in parallel to the other of said series connected second and third variable flow orifices of each of said first and second groups.

6. A steering control valve as claimed in claim 5, wherein said the other of said series connected second and third variable flow orifices of each of said first and second groups is fluidly disposed between said fluid return port and said one of said series connected second and third variable flow orifices of each of said first and second groups.

7. A steering control valve as claimed in claim 5, wherein said one of said series connected second and third variable flow orifices of each of said first and second groups is fluidly disposed between said fluid return port and said the other of said series connected second and third variable flow orifices of each of said first and second groups.

8. A steering control valve as claimed in claim 1, wherein said first group of variable flow orifices include series connected first and second variable flow orifices disposed between said fluid flow inlet port and said left turn outlet port, and a third variable flow orifice fluidly disposed between said right turn outlet port and said fluid flow return port;

said second group of variable flow orifices include series connected first and second variable flow orifices disposed between said fluid flow inlet port and said right turn outlet port, and a third variable flow orifice fluidly disposed between said left turn outlet port and said fluid flow return port; and wherein said variable flow orifice valve means defines a first variable flow orifice and a second variable flow orifice, each being connected in series with one of said series connected first and second variable flow orifices of each of said first and second groups and connected in parallel to the other of said series connected first and second variable flow orifices of each of said first and second groups.

9. A steering control valve as claimed in claim 8, wherein said the other of said series connected first and second variable flow orifices of each of said first and second groups is fluidly disposed between said fluid inlet port and said one of said series connected first and second variable flow orifices of each of said first and second groups.

10. A steering control valve as claimed in claim 8, wherein said one of said series connected first and second variable flow orifices of each of said first and second groups is fluidly disposed between said fluid inlet port and said the other of said series connected first and second variable orifices of each of said first and second groups.

11. A steering control valve as claimed in claim 1, wherein
said first group of variable flow orifices include series connected first and second variable flow orifices disposed between said fluid flow inlet port and said left turn outlet port, and series connected third and fourth variable flow orifices fluidly disposed between said right turn outlet port and said fluid flow return port;
said second group of variable flow orifices include series connected first and second variable flow orifices disposed between said fluid flow inlet port and said right turn outlet port, and series connected third and fourth variable flow orifice fluidly disposed between said left turn outlet port and said fluid flow return port; and wherein
said variable flow orifice valve means defines a first variable flow orifice and a second variable flow orifice, each being connected in series with one of said series connected first and second variable flow orifices of each of said first and second groups and connected in parallel to the other of said series connected first and second variable flow orifices of each of said first and second groups, and said variable flow orifice valve means defines a third variable orifice and a fourth variable orifice, each being connected in series with one of said series connected third and fourth variable flow orifices of each of said first and second groups and connected in parallel to the other of said series connected third and fourth variable flow orifices of each of said first and second groups.

12. A steering control valve as claimed in claim 11, wherein said one of said series connected first and second variable orifices of each of said first and second groups is fluidly disposed between said fluid inlet port and said the other of said series connected first and second variable flow orifices of each of said first and second groups, and said one of said series connected third and fourth variable flow orifices of each of said first and second groups is fluidly disposed between said fluid return port and said the other of said series connected third and fourth variable flow orifices of each of said first and second groups.

13. A steering control valve as claimed in claim 11, wherein said the other of said series connected first and second variable orifices of each of said first and second groups is fluidly disposed between said fluid inlet port and said one of said series connected first and second variable flow orifices of each of said first and second groups, and said the other of said series connected third and fourth variable flow orifices of each of said first and second groups is fluidly disposed between said fluid return port and said one of said series connected third and fourth variable flow orifices of each of said first and second groups.

14. A steering control valve as claimed in claim 11, wherein said one of said series connected first and second variable orifices of each of said first and second groups is fluidly disposed between said fluid inlet port and said the other of said series connected first and second variable flow orifices of each of said first and second groups, and said the other of said series connected third and fourth variable flow orifices of each of said first and second groups is fluidly disposed between said fluid return port and said one of said series connected third and fourth variable flow orifices of each of said first and second groups.

15. A steering control valve as claimed in claim 11, wherein said the other of said series connected first and second variable orifices of each of said first and second groups is fluidly disposed between said fluid inlet port and said one of said series connected first and second variable flow orifices of each of said first and second groups, and said one of said series connected third and fourth variable flow orifices of each of said first and second groups is fluidly disposed between said fluid return port and said the other of said series connected third and fourth variable flow orifices of each of said first and second groups.

16. The steering control valve as claimed in claim 1, wherein said variable flow orifice valve means is arranged in parallel with another one of said first and second group of variable flow orifices.

17. The steering control valve as claimed in claim 1, wherein said variable flow orifice valve means is responsive to vehicle speed.

18. A steering control valve for a power steering system for a vehicle, the power steering system including a pump as a source of fluid flow and a fluid motor adapted to be connected to a steering linkage of the vehicle, the steering control valve comprising:
an inner valve member;
a surrounding sleeve surrounding said inner valve member and having a fluid flow inlet port communicating with the pump and a fluid flow return port;
said inner valve being displaceable relative to said surrounding sleeve in response to an input torque to define therebetween parallel first and second flow paths connected between said fluid flow inlet port and said fluid flow return port to produce pressure differential in the fluid motor in response to said input torque;
each of said parallel first and second flow paths being divided into an upstream section and a downstream section with regard to the fluid motor, said parallel first and second fluid flow paths including a plurality of variable flow orifices divided into a first group and a second group, said first group of variable flow orifices having decreasing orifice areas in response to said inner valve member being displaced in one direction relative to said surrounding sleeve, said second group of variable flow orifices having decreasing orifice areas in response to said inner valve member being displaced in a direction opposite to the one direction relative to said surrounding sleeve;
said first group of variable flow orifices including a first variable flow orifice and a second variable flow orifice in series in said first flow path at least one of said upstream and downstream sections thereof, said second group of variable flow orifices including a third variable flow orifice and a fourth variable flow orifice in series in said second flow path at least one of said upstream and downstream sections thereof; and variable flow orifice valve means arranged in parallel with one of said first and second variable flow orifices and with one of said third and fourth variable flow orifices, said variable flow orifice valve means being responsive to vehicle control exclusive of said input torque applied to said inner valve member.

* * * * *